Nov. 19, 1940.    J. T. LANCASTER    2,222,212
SHAPING UPPERS OVER LASTS
Filed June 17, 1939    10 Sheets-Sheet 2

INVENTOR
John T. Lancaster
By his attorney
Victor C. Abb

Nov. 19, 1940.　　J. T. LANCASTER　　2,222,212
SHAPING UPPERS OVER LASTS
Filed June 17, 1939　　10 Sheets-Sheet 3

INVENTOR
John T. Lancaster
By his Attorney
Victor Cobb

Nov. 19, 1940.

J. T. LANCASTER 2,222,212

SHAPING UPPERS OVER LASTS

Filed June 17, 1939

INVENTOR

John T. Lancaster
By his Attorney
Victor Cobb

Nov. 19, 1940.  J. T. LANCASTER  2,222,212
SHAPING UPPERS OVER LASTS
Filed June 17, 1939  10 Sheets-Sheet 5
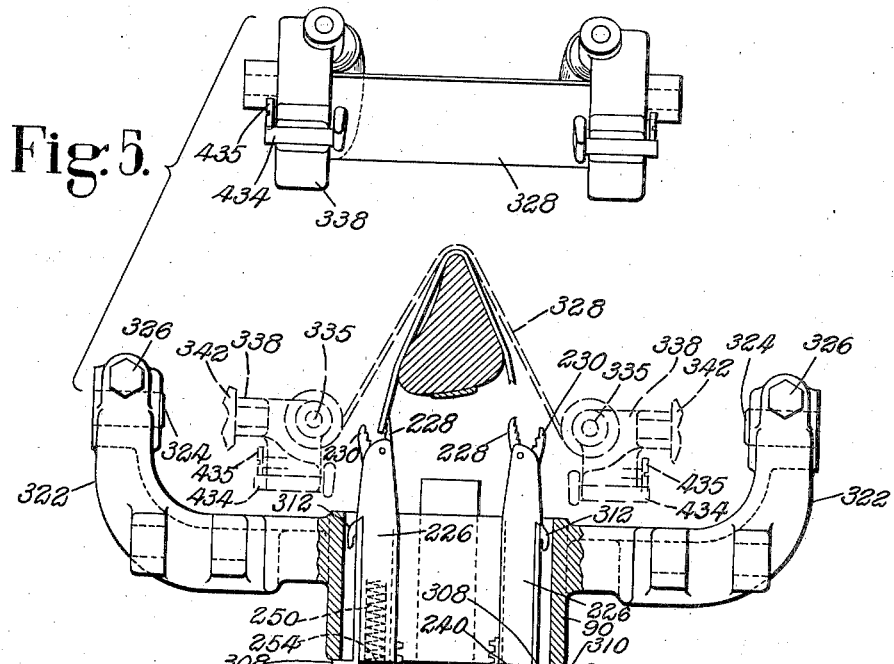
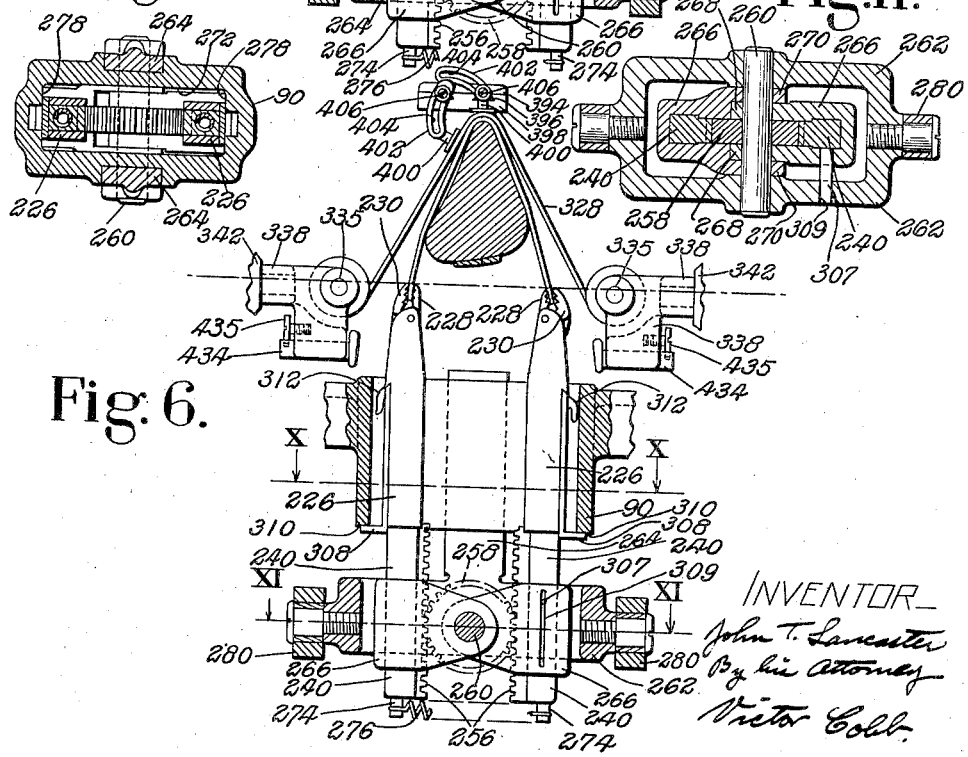

Nov. 19, 1940.   J. T. LANCASTER   2,222,212
SHAPING UPPERS OVER LASTS
Filed June 17, 1939   10 Sheets-Sheet 6
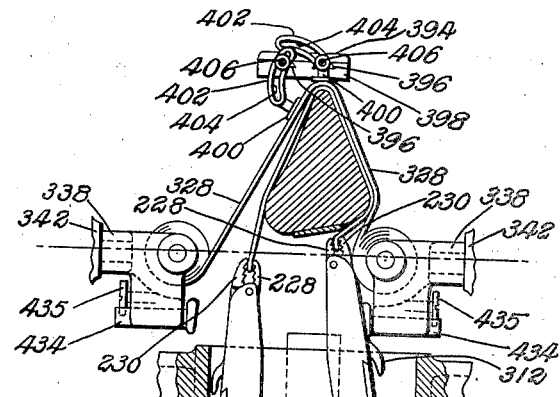
Fig. 7.
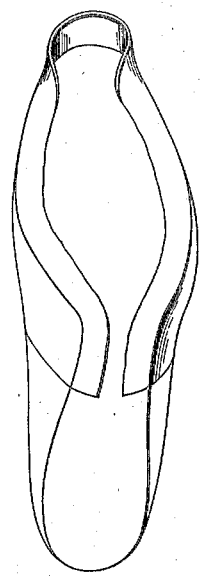
Fig. 28.
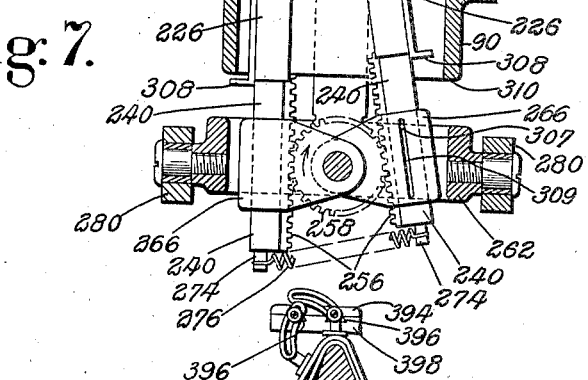
Fig. 8.
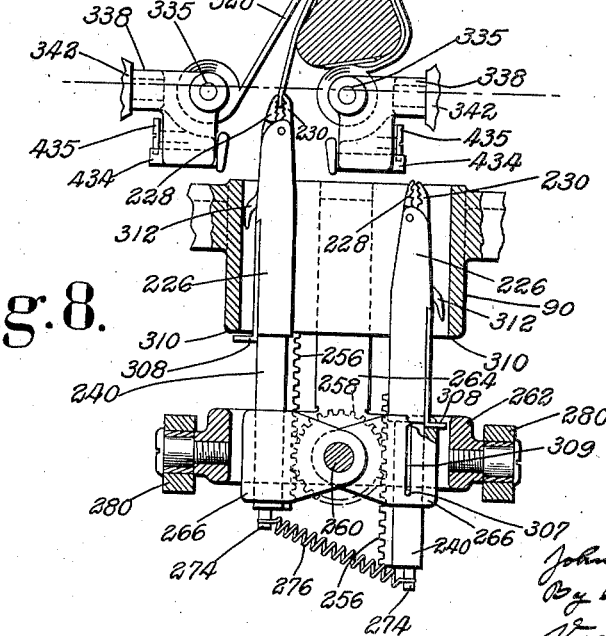
INVENTOR
John T. Lancaster
By his attorney
Victor Cobb Nov. 19, 1940.　　J. T. LANCASTER　　2,222,212
SHAPING UPPERS OVER LASTS
Filed June 17, 1939　　10 Sheets-Sheet 7
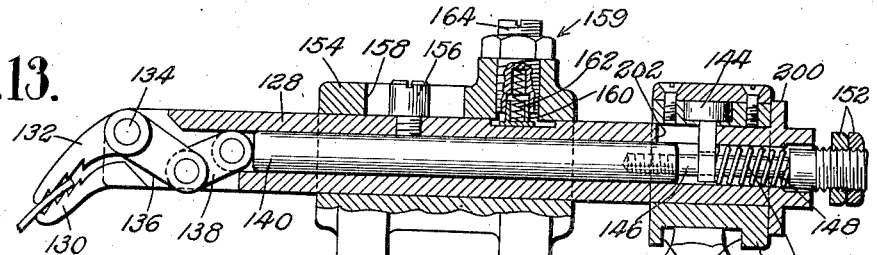
Fig.13.
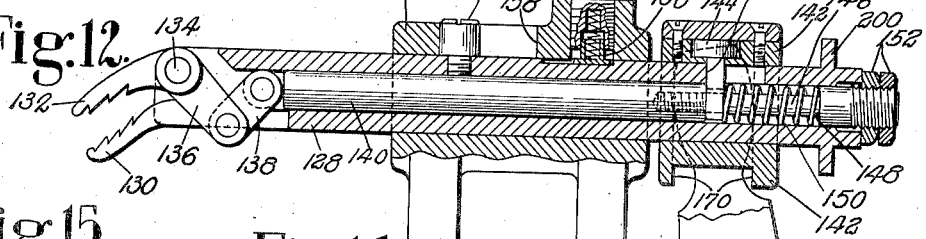
Fig.12.
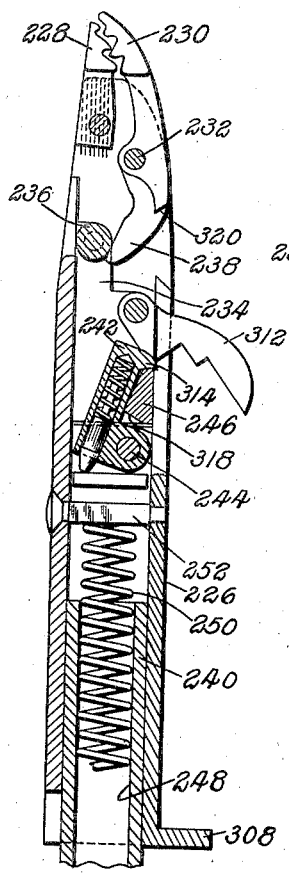
Fig.15.　Fig.14.
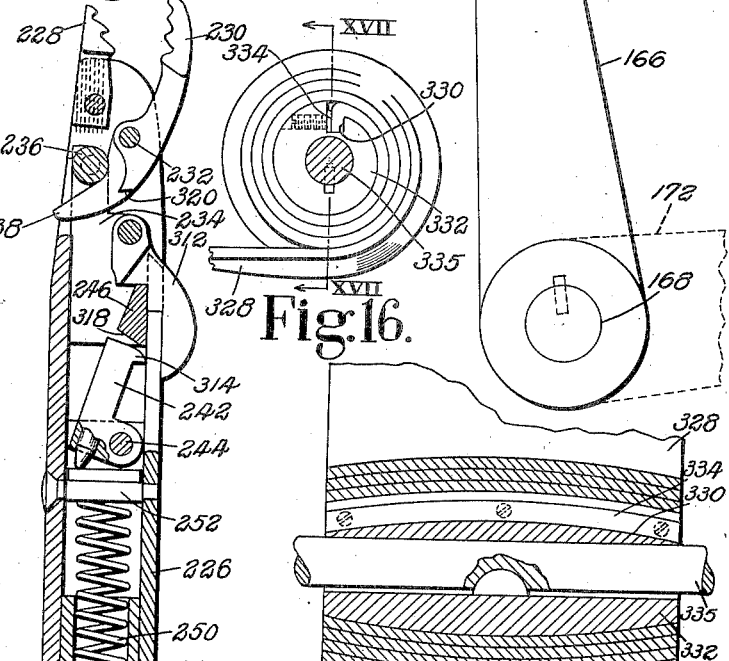
Fig.16.
Fig.17.
INVENTOR
John T. Lancaster
By his attorney
Victor Cobb Nov. 19, 1940.                J. T. LANCASTER                2,222,212
                          SHAPING UPPERS OVER LASTS
                           Filed June 17, 1939          10 Sheets-Sheet 8
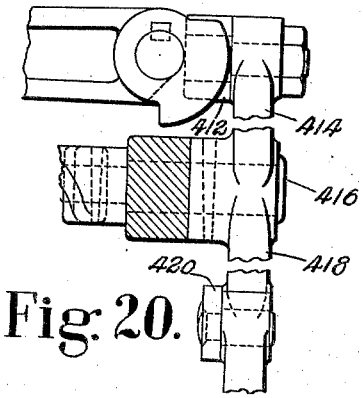
Fig. 20.
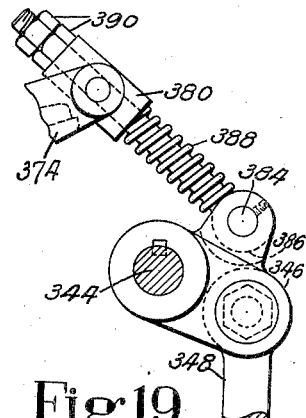
Fig. 19.
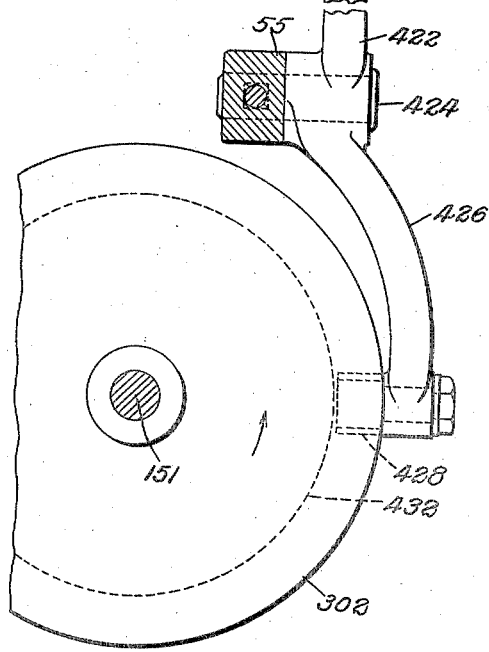
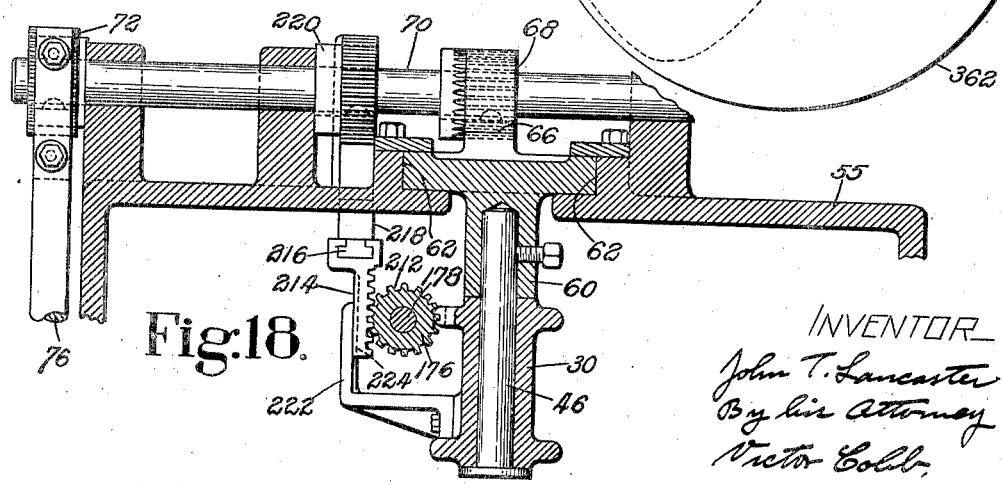
Fig. 18.
INVENTOR
John T. Lancaster
By his Attorney
Victor Cobb.

Nov. 19, 1940. J. T. LANCASTER 2,222,212
SHAPING UPPERS OVER LASTS
Filed June 17, 1939 10 Sheets-Sheet 9

INVENTOR
John T. Lancaster
By his Attorney
Victor Cobb

Patented Nov. 19, 1940

2,222,212

UNITED STATES PATENT OFFICE 2,222,212

SHAPING UPPERS OVER LASTS

John T. Lancaster, Newton, Mass., assignor to United Shoe Machinery Corporation, Borough of Flemington, N. J., a corporation of New Jersey Application June 17, 1939, Serial No. 279,705

47 Claims. (Cl. 12—7)

This invention relates to methods and means for use in shaping uppers over lasts and is herein illustrated by reference to the shaping over a last of a shoe upper terminating short of the heel end of the last preparatory to lasting its toe end, although it is to be understood that in some aspects the invention is not thus limited in its applicability.

The invention in one aspect provides a novel upper shaping method whereby the forepart of a two-part upper is subjected to heightwise strain by a pull applied at the opposite sides of its waist portion and to lengthwise strain by a pull applied at the margin of its toe end and the margins of the upper at the opposite sides of the waist portion are fastened to an insole on the last while the upper is held under lengthwise strain, the margin of the toe end of the upper being thereafter released in an unfastened condition. In accordance with the practice herein disclosed, the upper is tensioned lengthwise of the last after the beginning of the pull applied to its opposite side margins to tension it over the waist portion of the last, and while it is held under lengthwise strain it is conformed to the contour of the waist portion of the last and its marginal portions at the opposite sides of the ball of the last and rearwardly toward the shank are laid inwardly over the insole and fastened adhesively to the insole, although it is to be understood that the invention is not limited to the fastening of the upper in this particular manner. Preferably, as illustrated, the upper is tensioned heightwise of the last by pulling it in a direction substantially normal to that portion of the bottom face of the last that curves upwardly from the ball toward the shank. The forepart of the two-part upper is thus effectively held against any forward displacement from adjusted position on the last while it is tensioned lengthwise of the last to shape it properly for permanent attachment to the insole, thus insuring against any objectionable distortion of the upper.

The invention further provides a machine adapted for use in the practice of the above-described method. As herein illustrated, the machine comprises a novel organization of means for subjecting an upper, which may terminate short of the heel end of the last, to lengthwise strain by a pull applied at the margin of its toe end and for also pulling it over the last at the opposite sides of its waist portion, the pull at the sides beginning before the pull is applied at its toe end, together with means for fastening it at the sides of the waist portion to an insole on the last while maintaining it under lengthwise strain. The construction shown comprises waist grippers which grip the margin of the upper at the opposite sides of the last where the edge of the last bottom curves inwardly from the ball toward the shank and pull it heightwise of the last with a component of force also in a heelward direction, a toe gripper which grips the margin of the toe end of the upper and is movable to tension the upper lengthwise of the last after the beginning of the upper pulling movement of the waist grippers, and overlaying devices that are movable thereafter to lay the marginal portion of the upper at the opposite sides of the waist portion inwardly over the insole and press it into position to adhere to the insole, first at one side of the last and then at the other side, while the upper is held under tension by the toe gripper. Preferably and as illustrated, the waist grippers are mounted to move inwardly with the overlaying devices to overdraw the upper, and means is provided for operating the waist grippers to release the upper each at a predetermined time in the inward movement of the overlaying device associated therewith.

Various novel features of the invention are also to be recognized in means provided for pressing the upper into conformity to the contour of the last and for laying its margin inwardly over the insole at the opposite sides of the last. In the construction shown, the overlaying devices are connected to the opposite end portions of a flexible elastic apron arranged to extend across the top of the forepart of the last in a position initially out of engagement with the shoe upper, the overlaying devices being movable heightwise of the last to apply the apron to the upper and to tension it over the last and then movable inwardly over the bottom face of the last to cause the apron to conform the upper to the heightwise curvatures of the lateral faces of the last and to lay its margin inwardly over the insole at the opposite sides of the last. As herein shown, the overlaying devices comprise rolls that are shaped to conform substantially to the lengthwise curvature of that portion of the bottom face of the last which slopes upwardly from the ball toward the shank and that act through the apron during their inward movements to press it on the margin of the upper, the opposite end portions of the apron being wound upon the rolls and springs being provided that tend at all times to rotate the rolls in directions to tension the apron between them. In accordance with still another feature of the invention there are provided additional devices arranged to act through the apron to lay and press the marginal portion of the upper upon the insole at the opposite sides of the ball portion of the last.

The above and other features of the invention, including also novel last supporting and gripper adjusting means and various novel details of construction and combinations of parts, will now be more particularly described with reference to the accompanying drawings and thereafter pointed out in the claims.

In the drawings,

Fig. 5 is a view partly in full and partly in section on the line V—V of Fig. 4, with the parts shown in full lines in their initial starting positions and in dotted lines in the positions shown in Fig. 4;

Fig. 6 is a view similar to Fig. 5 with all the parts in the positions shown in Fig. 4;

Figs. 7 and 8 are views similar to Fig. 6 but showing the positions of the parts at different times in the inward movement of one of the overlaying devices;

Fig. 10 is a section on the line X—X of Fig. 6;

Fig. 11 is a section on the line XI—XI of Fig. 6;

Figs. 12 and 13 are detail sectional views of the toe gripper;

Figs. 14 and 15 are detail sectional views of one of the waist grippers;

Fig. 16 is an end view of one of the overlaying devices;

Fig. 17 is a section on the line XVII—XVII of Fig. 16;

Fig. 18 is a section on an enlarged scale on the line XVIII—XVIII of Fig. 2;

Figs. 19 and 20 are views in side elevation of cam wheels with which the machine is provided and parts associated therewith;

Fig. 24 is a detail plan view of a portion of the last clamping means;

Fig. 28 shows a shoe after it has been operated upon by the machine.

Figure 1:
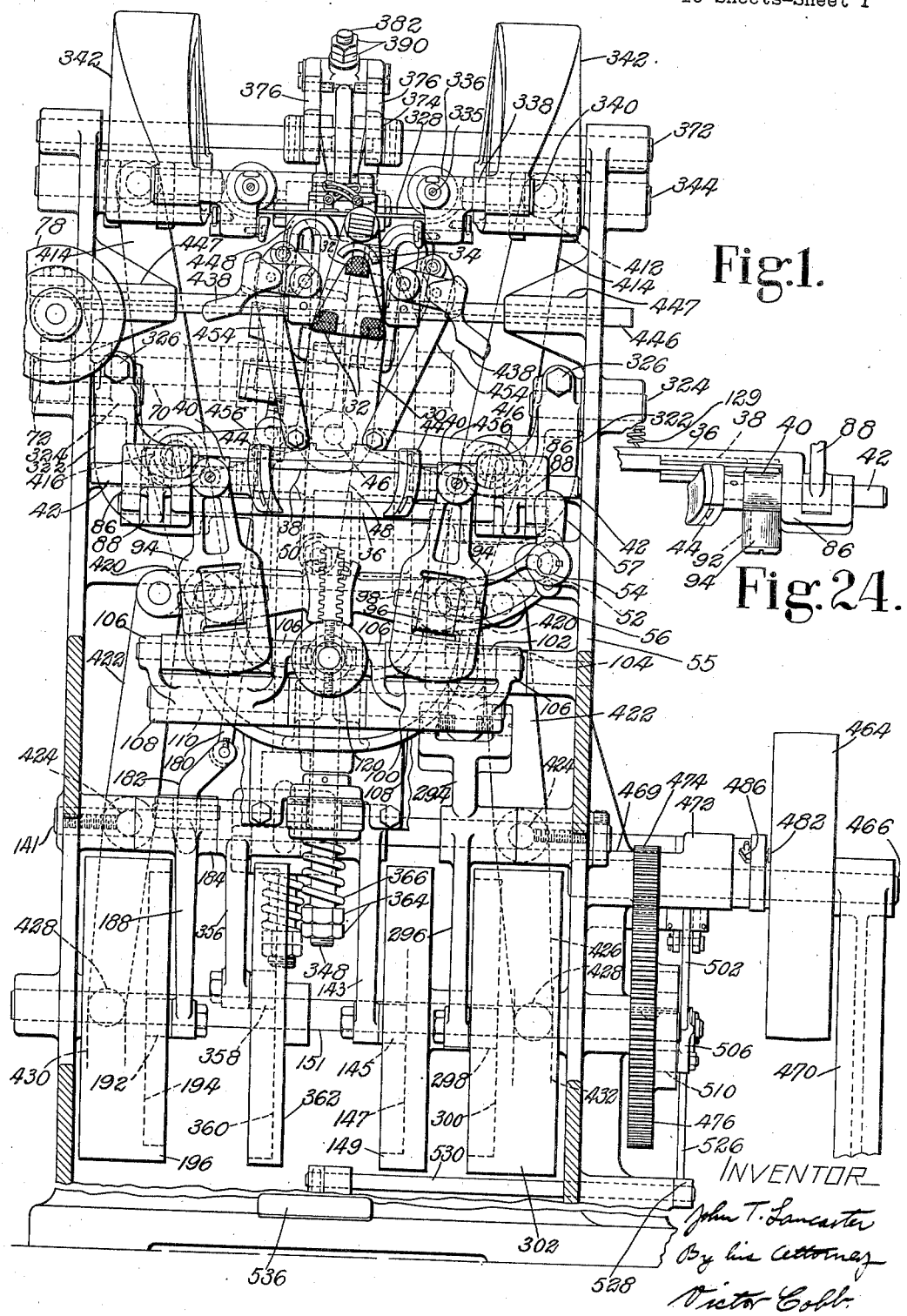
Fig. 1 is a view in front elevation of a machine adapted for use in the practice of the method and in which features of the invention are embodied, with portions of the frame broken away.
Figure 2:
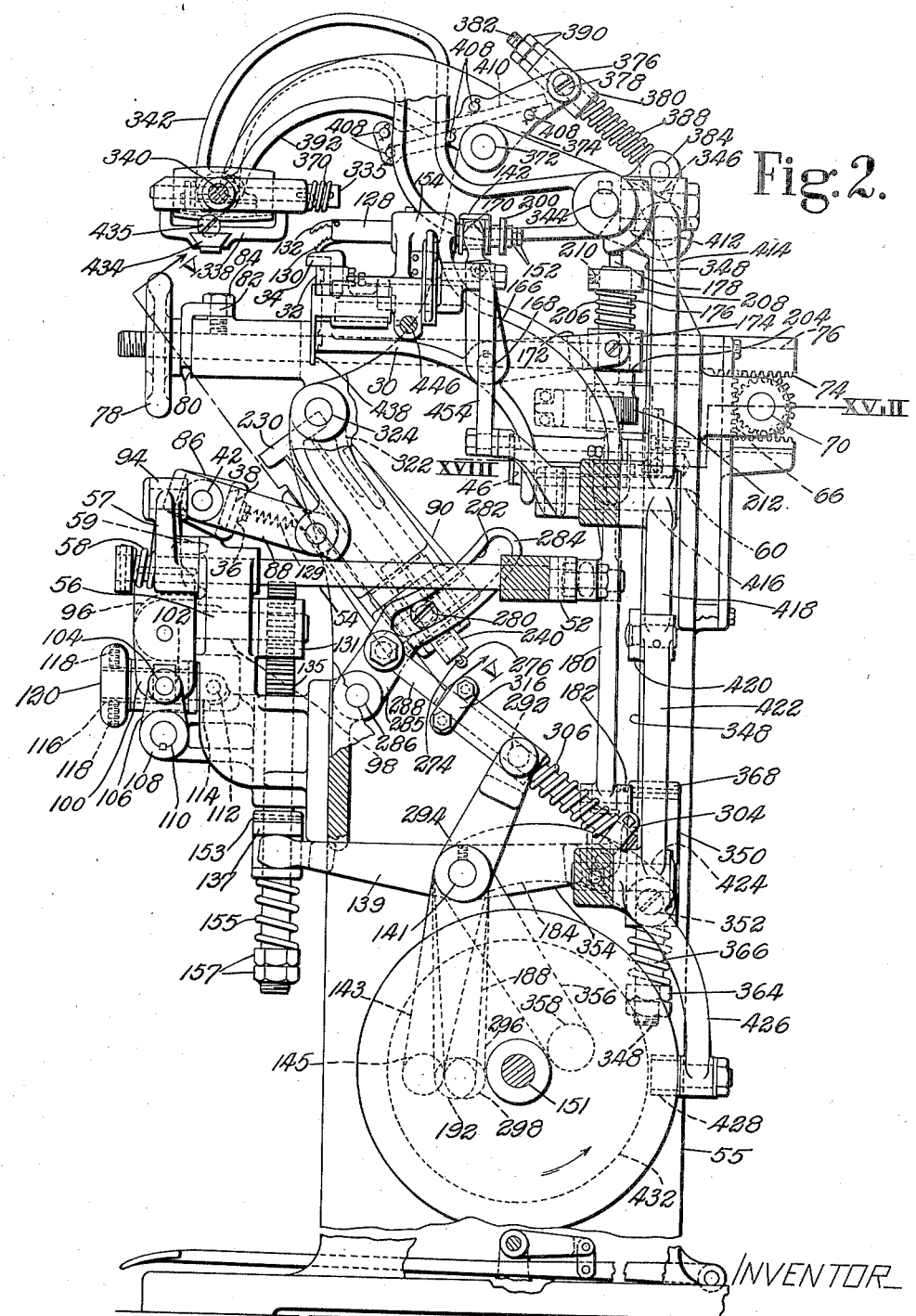
Fig. 2 is a view in right-hand side elevation of the machine shown in Fig. 1, with parts broken away and parts in section.
Figure 26:
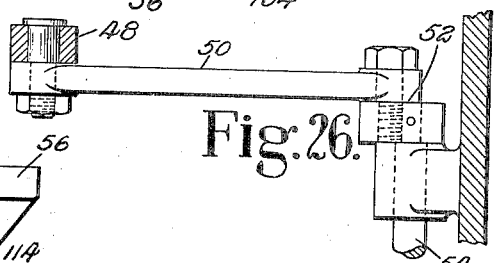
Fig. 26 is a detail plan view of a portion of the mechanism for shifting the forepart support laterally of the machine for right or left lasts.

The machine herein shown is provided with means for positioning a last having an insole assembled thereon with the toe end of the last pointing upwardly and the bottom face of its forepart portion located in a substantially vertical plane so that the operator by looking forwardly may conveniently view the top of the forepart of the last and may thus readily position the forepart of a two-part upper properly on the last. This positioning means comprises a forepart support or bracket 30 having formed thereon feet 32 (Figs. 1 and 2) for engaging the insole at the toe end and at the opposite sides of the forepart heelwardly of the toe end, and a toe gage or abutment 34 arranged to engage the toe end of the last. For engaging the bottom face of the insole at the heel end there is provided a substantially U-shaped bar 36 which is adjustable, by means hereinafter described, in directions heightwise of the last to accommodate lasts designed to take care of heels of different heights. Slidably mounted for movements toward and from each other laterally of the last in dovetail-shaped guideways 38 (Fig. 2) in the bar 36 are blocks 40 (Figs. 1, 3 and 24) through which extend short shafts 42 having fast on their inner end portions clamping members 44 arranged to engage the last at the opposite sides of the heel end and to hold the last on the forepart and heel end supports with its toe and in engagement with the toe gage 34 while the operator positions the forepart of a two-part upper on the last. To adapt the machine for operating upon right and left shoes the bracket 30 is fulcrumed upon a shaft 46 and has a depending arm 48 (Fig. 3) connected by a link 50 to an eccentric 52 (Fig. 26) pinned to the end of a shaft 54 which is supported partly by a bearing in the frame 55 of the machine and partly by a bearing formed in a bracket 56 fast to the frame 55 (Figs. 1 and 2). Keyed to the outer end of the shaft 54 is a hand lever 57 for turning the shaft to rotate the eccentric and thus to swing the bracket 30 about the axis of the shaft 46 into different lateral positions for right and left shoes, a spring 58 (Fig. 2) being provided for holding the hand lever with a pin 59 carried by the hand lever extending into any one of a number of recesses in the bracket 56. The shaft 46 is carried by a substantially T-shaped bracket 60 slidably mounted in vertical guideways 62 formed in the frame 55 of the machine (Fig. 18). The bracket 60 has formed thereon rack teeth 66 arranged to be engaged by the teeth of a pinion 68 fast on a shaft 70 mounted in suitable bearings on the frame 55 and having secured to its outer end a pinion 72. Engaging the teeth of the pinion 72 are rack teeth 74 (Fig. 2) formed on a slide 76 mounted in the frame 55 and having its outer end portion threaded to receive a hand wheel 78 which is provided with a circumferential groove 80 to receive the downwardly extending forked portion of an L-shaped member 82 fastened to the frame 55 by a screw 84. It will be evident that by rotating the hand wheel 78 endwise movement may be imparted to the slide 76 to rotate the pinion 72 and through the shaft 70 and the pinion 68 to raise or lower the bracket 60 and thus to vary the heightwise position of the bracket 30 to accommodate lasts of different lengths.

Figure 25:
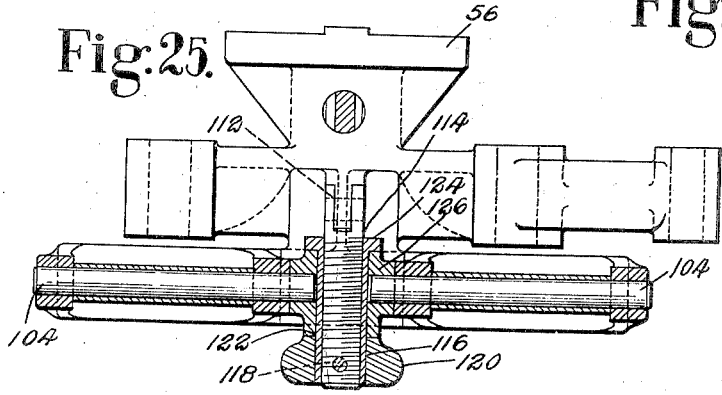
Fig. 25 is an enlarged detail view partly in plan and partly in section of a portion of the mechanism for adjusting the heel end supports and the waist grippers heightwise of the last.

The U-shaped bar 36 for supporting the last at the heel end has its rearwardly extending arms 86 bored to receive the short shafts 42 which are in axial alinement and which extend also through the blocks 40. For supporting the bar 36 there are provided parallel links 88 which are pivotally connected at their rear ends to a bracket 90 mounted to swing forwardly and rearwardly as hereinafter described and at their forward ends to the short shafts 42, the arms 86 of the bar 36 being forked to straddle the forward ends of the links 88 (Fig. 24). Each block 40 has formed thereon a trunnion 92 (Fig. 24) mounted to turn in the upper end of a lever 94 pivotally connected to the head 96 (Fig. 2) of a shaft 98 mounted for turning movement in the bracket 56. Each lever 94 has a depending bifurcated portion 100 the arms of which are arranged to engage the opposite side faces of a block 102 mounted on a shaft 104 supported by the upwardly extending arms 106 of a lever 108 which is keyed to a shaft 110 supported by the bracket 56. Pivotally connected to the bracket 56 at 112 (Figs. 2 and 25) is a rod 114 upon which there is threaded a bushing 116 to the outer end of which there is secured by screws 118 a hand wheel 120. Surrounding the bushing 116 between a shoulder 122 on the hand wheel and the head 124 of the bushing is a sleeve 126 provided with recesses to receive the end portions of the shafts 104, the construction being such that by rotating the hand wheel 120 the levers 108 may be swung about their pivotal connections to the bracket 56 and impart swinging movement to the levers 94 to vary the position of the U-shaped bar 36 heightwise of the last. Extending between the U-shaped bar 36 and the links 88 are springs 129 which tend to hold the bar 36 against swinging movement relatively to the links about the shafts 42.

Figure 3:
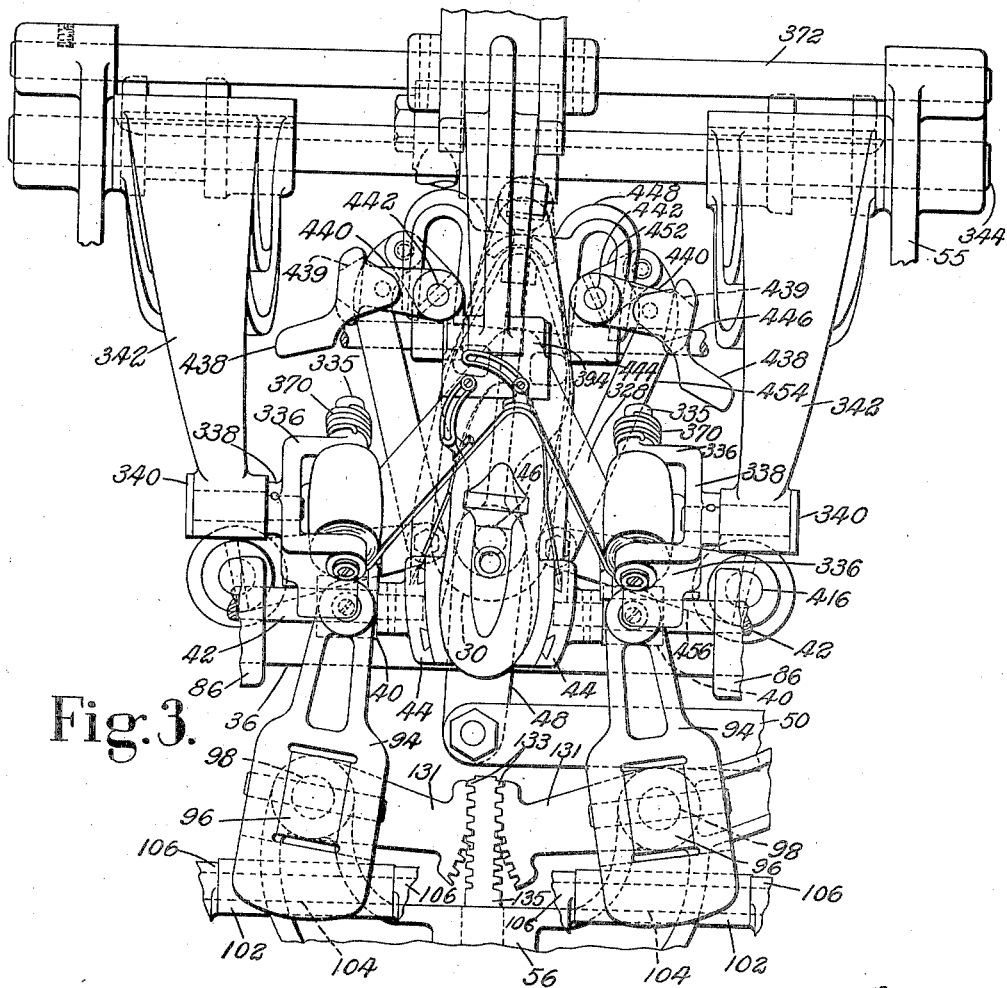
Fig. 3 is an enlarged view of the upper portion of the machine in front elevation, showing the parts in the positions they assume at the time when the overlaying devices have completed their movement heightwise of the last to tension the apron over the last.

Fast to the inner end of each shaft 98 is a gear sector 131 the teeth of which mesh with rack teeth 133 formed on a rack bar 135 vertically movable in the bracket 56 (Fig. 3). Slidably mounted on the rack bar 135 is a sleeve 137 (Fig. 2) having its opposite side faces slotted to receive the arms of a forked lever 139 mounted on a shaft 141 supported by bearings in the frame 55 and having a downwardly extending arm 143 carrying a cam roll 145 engaging a path cam 147 formed in the side face of a cam wheel 149 fast on a shaft 151 supported by suitable bearings on the frame 55 (Fig. 1). The sleeve 137 is held in engagement with a collar 153 pinned to the rack bar 135 by a spring 155 surrounding the rack bar below the sleeve and engaging at its lower end a nut and lock nut 157 threaded on the lower end of the rack bar. The shape of the cam path 147 is such that substantially at the beginning of the cycle of the machine, as more particularly hereinafter explained, the lever 139 is swung in a direction to impart downward movement to the rack bar 135 through the spring 155. Downward movement of the rack bar 135 acts through the gear sectors 131 to swing the levers 94 in directions to move the members 44 toward each other to clamp the heel-end portion of the last between them. In the return of the parts to starting positions, the sleeve 137 acts by engagement with the collar 153 to impart upward movement to the rack bar 135 to cause the gear sectors 131 to swing the levers 94 in directions to move the clamping members 44 away from each other to release the last and shoe.

For pulling the upper over the last there are provided in the machine herein shown a toe gripper for gripping it at the toe end and two grippers for gripping it at the opposite sides of the waist portion of the last in locations where the edge of the last bottom curves inwardly from the ball toward the shank. The toe gripper comprises a casing 128 (Figs. 12 and 13) upon the outer end of which are mounted a pair of upper gripping jaws consisting of a jaw 130 which is fast on the casing and a jaw 132 pivoted at 134 to the casing for swinging movements toward and from the fixed jaw 130. The jaw 132 has a rearwardly extending arm 136 connected by a link 138 to a bar 140 slidingly mounted in the casing 128 and forward movement of which tends to swing the jaw 132 away from the jaw 130 to open the gripper for the reception of the upper materials. For imparting rearward movement to the bar 140 to move the jaw 132 toward the jaw 130 to grip the upper there is mounted on the casing 128 a slide 142 carrying a T-shaped member 144 having a depending forked portion arranged to straddle a stud 146 threaded into the bar 140. Surrounding the stud 146 between the forked portion of the member 144 and a shoulder 148 on the stud is a spring 150 and threaded on the outer end portion of the head of the stud is a nut and lock nut 152 arranged to engage the end face of the casing 128. Movement of the slide 142 relatively to the casing 128 in a rearward direction acts through the member 144 and spring 150 to move the bar 140 rearwardly to close the gripper jaws 130, 132. The casing 128 is slidingly mounted in a boss 154 on the bracket 30 and is held against turning movement in the boss by the engagement of the head of screw 156 carried by the casing with the boss 154 in a lengthwise slot 158 in the boss. To insure that the jaw 132 will be swung toward the upper substantially at the beginning of the rearward movement of the slide 142 there is provided a friction device 159 (Figs. 12 and 13) for holding the casing 128 against rearward movement with the slide 142, this device comprising a brass plug 160, a spring 162 for holding the plug in engagement with the casing and a screw 164 threaded into the boss 154 for varying the tension of the spring.

For imparting to the slide 142 its jaw closing movement there is provided a lever arm 166 which is keyed to a shaft 168 supported by the bracket 30. The upper end of the lever arm 166 is forked to straddle the slide 142, the arms of this forked portion engaging the opposite side faces of the slide in a slot 170 formed in the slide. Keyed to the shaft 168 is a rearwardly extending forked arm 172 connected by trunnions to a block 174 slidingly mounted on a sleeve 176 threaded on a rod 178 which is connected by a pair of links 180, 182 (Figs. 1 and 2) to one arm of a bell-crank lever 184 mounted on the shaft 141 and having a downwardly extending arm 188 carrying a cam roll 192 arranged to engage a cam path 194 formed in the side face of a cam wheel 196 fast on the shaft 151. The shape of the cam 194 is such that at a predetermined time in the cycle, as more fully hereinafter explained, the bell-crank lever 184 is swung in a direction to impart clockwise movement to the lever arm 166 (Fig. 2) to move the slide 142 rearwardly. As the slide 142 moves rearwardly it acts through the member 144 and the spring 150 to move the bar 140 rearwardly to close the toe gripper after which as the slide 142 engages a flange 200 (Figs. 12 and 13) on the casing 128 rearward movement is imparted to the casing 128 to cause the toe gripper to tension the upper over the toe end of the last. As the lever arm 166 is swung in the opposite direction to return the parts to starting positions the friction device 159 acts to hold the casing 128 against forward movement until after the gripper jaw 132 has been swung away from the jaw 130 to open the gripper after which, as the member 144 engages a shoulder 202 on the casing, the toe gripper is moved forwardly to its initial position.

As previously pointed out, the arm 172 is pivotally connected to a block 174 (Fig. 2) slidingly mounted on a sleeve 176 which is threaded on a rod 178. The block 174 is held against a shoulder 204 on the sleeve 176 by a spring 206 which surrounds the sleeve between the block 174 and an adjustable collar 208 secured to the sleeve by a set screw 210. Fast to the sleeve 176 is a gear 212 arranged to be engaged by rack teeth formed on a bar 214 (Fig. 18) vertically movable on a guideway 216 formed on a rack bar 218 mounted in a horizontal guideway in the frame 55 and engaging the teeth of a gear 220 keyed to the shaft 70. It will be evident that as the shaft 70 is rotated to impart heightwise movement to the bracket 30, as hereinbefore described, the sleeve 176 is rotated on the threaded rod 178 by movement of the rack bars 214, 218 to impart to the block 174 movement in the same direction and to the same extent as the bracket 30, thus permitting adjustment of the bracket 30 to accommodate shoes of different lengths without imparting any closing movement to the toe gripper. For supporting the rack bar 214 there is provided a bracket 222 which is fast to the bracket 30 and has a tongue and slot connection 224 with the rack bar.

Figures 4, 9:
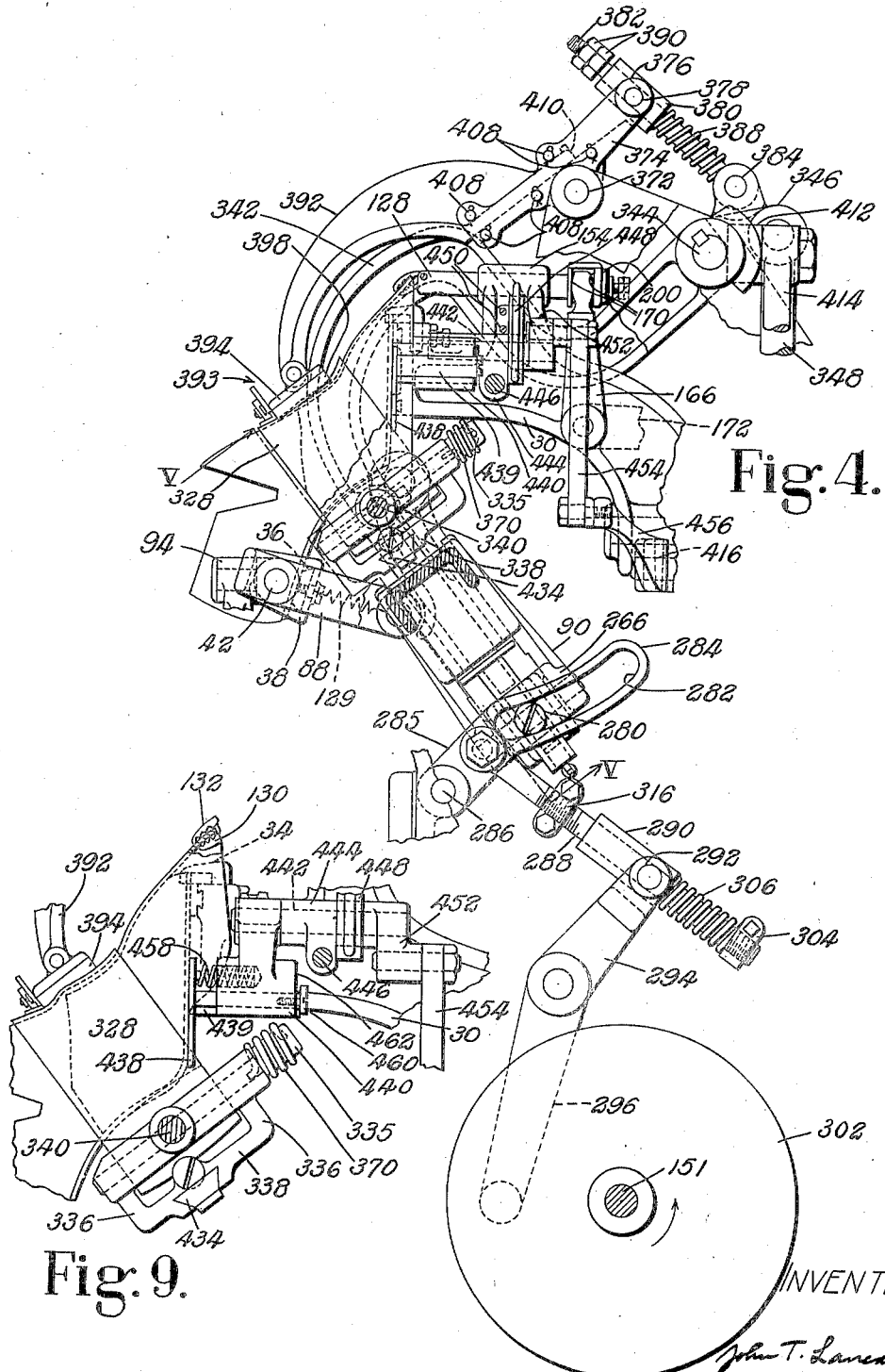
Fig. 4 is a view in right-hand side elevation of the mechanism shown in Fig. 3, showing also the means for operating the waist grippers.
Fig. 9 is a view in right-hand side elevation of a portion of the mechanism shown in Fig. 4, but with the parts in the positions shown in Fig. 8.

The two grippers for pulling the upper at the opposite sides of the waist portion of the last are substantially alike in construction, each comprising a casing 226 (Figs. 14 and 15) upon the upper end of which are mounted a pair of upper gripping jaws consisting of the jaw 228 which is fast on the casing and a jaw 230 pivoted at 232 to the casing. For moving the jaw 230 toward the other jaw to grip the upper there is mounted in the casing a jaw closing member or slide 234 carrying a roll 236 arranged to engage the tail portion 238 of the pivoted jaw 230. The slide 234 is connected to a second slide 240 in the casing 226 by a spring-operated latch 242 which is pivoted at 244 to the slide 240 and is arranged to engage an abutment 246 on the slide 234. The slide 240 has a central recess 248 to receive a spring 250 which bears at its upper end against a pin 252 carried by the casing 226 and at its lower end against a shoulder 254 on the slide 240 (Fig. 5). The slides 240 have formed thereon rack teeth 256 (Figs. 5, 6, 7, and 8) connected by a pinion 258 fast to a shaft 260 rotatably mounted in a spider 262 which is provided with upwardly extending portions 264 slidably mounted in guideways formed in the opposite side faces of the bracket 90 (Fig. 10). Each slide 240 is mounted for lengthwise movement in a guideway formed in a block 266 (Fig. 11) pivotally connected to the shaft 260, the blocks 266 being provided with inwardly extending forked arms. The forked arms 268 of one block are arranged to straddle the pinion 258 and the forked arms 270 of the other block are arranged to straddle the arms 268 of the first block. The side grippers extend upwardly through a central recess 272 in the bracket 90 (Fig. 10), and projecting from the end portions of the slides 240 of the side grippers are pins 274 connected by a spring 276 which tends to swing the side grippers away from each other and to hold them with the casings 226 in engagement with locating surfaces 278 on the bracket 90. The spider 262 carries rolls 280 extending into arcuate slots 282 formed in the arms 284 of a two-armed lever 285 pivotally connected at 286 to the frame 55 (Figs. 2 and 4). Pivotally connected to one of the arms 284 is a rod 288 having slidably mounted thereon a block 290 connected by trunnions 292 to the forked arm of a bell-crank lever 294 fulcrumed on the shaft 141 and having a downwardly extending arm 296 carrying a cam roll 298 arranged to engage a cam path 300 formed in the side face of a cam wheel 302 on the shaft 151 (Fig. 1). Surrounding the rod 288 between the block 290 and an adjustable collar 304 secured to the lower end of the rod is a spring 306 which is compressed as the bell-crank lever 294 is swung in a clockwise direction (Fig. 2) by the cam 300 to impart swinging movement to the arm 284 through the rod 288 in a direction to impart downward movement to the slides 240. As the slides 240 move downwardly the springs 250 act on the pins 252 to uphold the casings 262 with abutments 308 on the casings in engagement with the bottom face 310 of the bracket 90 (Figs. 5 and 6). Since the slides 234 are connected to the slides 240 by the latches 242 they are moved downwardly with the slides 240, thereby causing the rolls 236 to act on the tail portions 238 of the gripper jaws 230 to swing them toward the jaws 228 to grip the upper, after which the side grippers are moved downwardly with the slides 234, 240 to pull the upper. It will be understood that the pull of the side grippers on the upper at the opposite sides of the last is equalized through the pinion 258. For operating each side gripper to release the upper at a predetermined time in the cycle, as more fully hereinafter explained, there is pivotally connected to each slide 234 a member 312 which is shaped, as shown particularly in Figs. 14 and 15, to engage the nose portion 314 of the latch 242 and is arranged to be swung from the position shown in Fig. 15 to the position shown in Fig. 14 by means hereinafter described to operate the latch 242 to disconnect the slides 234 and 240 and to cause the gripper jaws 228, 230 to release the upper. In the use of the machine herein shown the upper is released first at the right-hand side of the machine and at a later time in the cycle, for purposes more fully hereinafter explained, at the left-hand side of the machine. As the upper is thus released by the right-hand gripper the spider 262' is moved downwardly by the action of the spring 306 on the rod 288. As the spider 262 is thus moved downwardly the gear 258 is rotated by engagement of its teeth with the rack teeth 256 on the slide 240 of the left-hand gripper, thus imparting downward movement to the slide 240 of the right-hand gripper until a pin 307 carried by that slide engages the block 266 at the lower end of a lengthwise slot 309 in the block, the construction being such that the pin thus engages the block before the collar 316 is moved into engagement with the upper end face of the block 290, the spring 306 thereafter acting on the left-hand gripper to hold the upper at that side of the last under tension. As the slide 240 of the right-hand gripper moves downwardly the spring 250 is fully expanded, after which the casing 226 of the right-hand gripper moves downwardly with the slide 240 into the position shown in Fig. 8. As the bell-crank lever 294 and the arm 284 are swung in a counterclockwise direction after the upper has been released by the left-hand gripper and near the end of the cycle of the machine (Fig. 2) by the cam 300 to return the parts to starting positions the casings 226 are moved upwardly by the slides 240 through the springs 250 until the abutments 308 engage the bottom face 310 of the bracket 90, after which, as the slides 240 continue to move upward relatively to the casings 226, the latches 242 by engagement with the bottom faces 318 of the abutments 246 impart upward movement to the slides 234 until the members 312 engage shoulders 320 on the gripper jaws 230, after which the slides 240 are moved relatively to the slides 234 into position to permit the latches 242 to engage the upper faces of the abutments 246, each member 312 being swung outwardly into a position similar to that shown in Fig. 15 by the movement of its associated latch 242 into position again to connect the slide 234 with the slide 240.

The bracket 90 for supporting the side grippers is provided with a pair of upwardly extending arms 322, the upper portion of each arm being formed as a split bearing for a stud 324 mounted to turn in the frame 55 (Fig. 1), a screw 326 being provided for moving the two parts of each split bearing toward each other to clamp each stud 324 in the arm 322. The studs 324 are mounted to turn about a common axis extending laterally of the shoe and located adjacent to the junction of the forepart and shank portions of the bottom of the last. The arcuate slot 282 in the arm 284 (Fig. 2) is concentric with the axis of the studs 324 and the construction is such that as the U-shaped bar 36 is adjusted to accommodate lasts designed to take care of heels of different heights the bracket 90 is swung through the links 88 about the axis of the studs 324 to position the waist grippers for upward and downward movements toward and from each last in directions substantially normal to that portion of the bottom face of the last that curves upwardly from the ball toward the shank.

For conforming the upper tightly to the contour of the waist portion of the last and for laying its marginal portion inwardly over the insole in position to adhere thereto the illustrated machine is provided with a flexible lasting apron 328, the opposite end portions of which are wound upon overlaying devices, illustrated as rolls 332, arranged to act through the apron in the overlaying operation to increase the pressure of the apron on the margin of the upper. The lasting apron, consisting preferably of a sheet of rubber, has its opposite ends extending into grooves 330 (Figs. 16 and 17) formed in the rolls 332, gibs 334 being provided for clamping the ends of the apron against the side faces of the grooves. The rolls 332 are keyed to shafts 335 supported by the spaced arms 336 of yokes 338 that are pinned to studs 340 carried by curved arms 342 keyed to a shaft 344 mounted to turn in bearings at the upper end of the frame 55 of the machine. Fast to the shaft 344 substantially midway between its ends is an arm 346 (Figs. 2 and 19) and pivotally connected to this arm is a downwardly extending rod 348 on which there is slidably mounted a sleeve 350 connected by trunnions 352 to the forked end of one arm of a bell-crank lever 354 pivotally mounted on the shaft 141 and provided with a downwardly extending arm 356 carrying a cam roll 358 engaging a cam path 360 formed in the side face of a cam wheel 362 mounted on the shaft 151 (Fig. 19). Surrounding the rod 348 between the sleeve 350 and a nut and lock nut 364 threaded on the end of the rod is a spring 366 and engaging the upper end face of the sleeve 350 is a collar 368 fast to the rod. Surrounding one end portion of each rod 335 (Fig. 3) is a torsion spring 370. The springs 370 tend to rotate the rods 335 in opposite directions to wind the end portions of the rubber apron 328 tightly about the rolls 332 and to hold the apron stretched between the rolls. The shape of the cam 360 is such that at a predetermined time in the cycle, as hereinafter more particularly explained, the bell-crank lever 354 is swung in a counterclockwise direction, as viewed in Fig. 19, to rock the shaft 344 through the rod 348 in a direction to swing the arms 342 downwardly from the position shown in Fig. 2 to the position shown in Fig. 3 to tension the apron tightly over the waist portion of the last.

As shown particularly in Figs. 1 and 2, there is mounted at the upper end of the frame 55 of the machine a transversely extending shaft 372 and pivotally mounted on this shaft is a support 374 having a pair of rearwardly extending arms 376 provided with bearings for trunnions 378 (Figs. 2 and 4) formed on a sleeve 380 slidably mounted upon a rod 382 pivotally connected at 384 to a boss formed on the arm 346. Surrounding the rod 382 between the head 386 of the rod and the sleeve 380 is a spring 388 and threaded on the end portion of the rod 382 and engaging the opposite end face of the sleeve 380 is a nut and lock nut 390.

Slidably mounted on the support 374 is a curved arm 392 (Figs. 2 and 4) carrying at its forward end a shoe and last support arranged to engage the apron substantially opposite the top of the instep of the last and to support the last and shoe against the upwardly directed pressure of the rolls 332 as they move inwardly over the bottom of the shoe to press the marginal portion of the upper through the apron upon the insole. The support comprises a block 394 pivotally connected to the arm 392 and provided with two dovetail-shaped tongues 396 (Figs. 7 and 8) arranged to enter similarly shaped grooves in a pad 398 formed of rubber or other suitable material. Cemented or otherwise secured to the apron 328 are blocks 400 each provided with a curved portion 402 having formed therein an arcuate slot 404 through which extends a shouldered stud 406 threaded into the block 394. As the arm 346 is swung in a counterclockwise direction (Fig. 2) to impart downward swinging movement to the arms 342 it acts also through the spring 388 to swing the bracket 374 in the same direction about the axis of the shaft 372. This causes the arm 392 to slide relatively to the support 374 by reason of the pull of the apron thereon, the arm being held in fixed relation to the apron 328 by the blocks 400 connecting the forward end of the arm and the apron. Preferably and as illustrated, the arm 392 is guided for sliding movement relatively to the support 374 by short inwardly extending pins 408 (Figs. 2 and 4) carried by the support and engaging the upper and lower faces of the base portion 410 of the arm. As the arm 392 is swung downwardly with the arms 342 the pad 398 acts to press the upper through the apron against the top of the instep of the last and in the continued downward swinging movement of the arms 342, into the positions shown in Fig. 4, the spring 388 is compressed in response to the continued swinging movement of the arm 346. The block 394 and the pad 398 are long enough to accommodate both right and left shoes and preferably the blocks 400 are fastened to the apron 328 in such spaced relation widthwise of the machine that one or the other of them will engage the apron substantially opposite the top of the instep of the last in operating on right and left shoes. Preferably also, the blocks 400 are positioned forwardly and rearwardly of the machine in such spaced relation as to permit them to swing relatively to each other without interference between their curved portions 402 as the apron is applied tightly to the upper in the downward swinging movement of the arms 342.

Each arm 342 (Figs. 1, 2 and 20) is slotted to receive a roll 412 carried by a lever 414 which is pinned to a rockshaft 416 mounted to turn in a bearing on the frame 55 and is provided with a downwardly extending arm 418 connected by a short link 420 to one arm of a lever 422 pivotally connected at 424 to the frame 55 and having a downwardly extending arm 426 carrying a cam roll 428. By reference to Fig. 1 it will be seen that these connections from the arms 342 to the cam rolls 428 are located at opposite sides of the machine, the cam rolls 428 engaging cam paths 430, 432 formed respectively in the cam wheels 196 and 302. The shapes of the cam paths 430, 432 are such that after the arms 342 have been swung downwardly into the positions shown in Fig. 4, the arm 342 at the right-hand side of the machine is moved bodily inward along the shaft 344 to cause the roll 332 acting through the apron 328 to lay the marginal portion of the upper at this side of the shoe inwardly over the insole and to press it into position to adhere to the insole, after which this arm is moved outwardly. Substantially at the beginning of the outward movement of the arm 342 at the right-hand side of the machine, the arm 342 at the left-hand side of the machine is moved bodily inward, its associated roll 332 acting through the apron to lay the marginal portion of the upper at that side of the shoe inwardly over the insole and to press it into position to adhere to the insole, the arm 342 at the left-hand side of the machine being moved thereafter outwardly to the position shown in Fig. 6.

As each arm 342 is moved bodily inward along the shaft 344 in response to the swinging of its associated lever 422, the gripper at that side of the shoe is swung inwardly by the engagement of the portion of the apron would upon the roll 332 with the gripper casing 226 (Fig. 7). As the gripper is thus swung it is moved by the pull of the upper thereon toward the bottom face of the insole as the marginal portion of the upper is pressed against the insole by the roll 332 acting through the apron 328. As the gripper is moved toward the insole the member 312 is engaged by the inwardly moving head of an adjustable plunger 434 carried by the yoke 338 and is swung in a direction to operate the latch 242 to disconnect the slides 234 and 240 and to cause the gripper jaws 228 and 230 to release the upper. The plunger 434 is held in adjusted position relatively to the yoke 338 by a screw 435 threaded into the yoke and having its head engaging the plunger in a slot formed in the plunger. It will be understood that by adjustment of the screw 435 the position of the plunger 434 relatively to the yoke 338 may be varied to vary the time in the inward movement of the arm 342 when the upper is released by the gripper jaws 228, 230. As previously pointed out, when the slides 234 and 240 are disconnected the spring 306 (Fig. 4) acts on the rod 288 to lower the spider 266, thus causing the gear 258 (Figs. 7 and 8) to be rotated in a direction to move the slide 240 downwardly far enough to permit the spring 250 (Figs. 14 and 15) to expand fully and the casing 226 thereafter to move downwardly with the slide 240 until the gripper jaws 228, 230 are moved out of the path of the inwardly moving plunger 434 (Fig. 8). As each gripper thus moves downwardly it is swung outwardly by the spring 276 until its casing 226 engages the surface 278 on the bracket 90. It will be understood that after the right-hand gripper has released the upper and has been moved downwardly to the position shown in Fig. 8, the spring 306 acts to exert a downward pull on the left-hand gripper, thus maintaining the upper at that side of the shoe under tension until the left-hand gripper is operated to release the upper in the inward movement of the arm 342 at that side of the machine.

In the illustrated machine, when the arms 342 are in the positions shown in Fig. 6, the rolls 332 are positioned heightwise of the shoe in such relation to its bottom face as to exert substantial pressure on the marginal portion of the upper through the apron 328 during the latter portion of their inward movements, the shoe being supported against the upwardly directed pressure of the rolls 332 by the shoe support 394. As illustrated, the rolls 332 are shaped to conform substantially to the lengthwise curvature of the shank portion of the last bottom so that as they move inwardly over the bottom of a shoe first at one side of the shoe and then at the opposite side they act through the apron on the marginal portion of the upper, rearwardly of the ball line of the shoe, to press it into position to adhere firmly to the insole. In order to insure that the marginal portion of the upper will be laid inwardly over the insole and pressed into position to adhere thereto along the opposite sides of the ball portion of the shoe, the illustrated machine is provided with means for thus acting on the upper through the apron in that location. This means comprises wipers 438 (Figs. 1 and 3), one at each side of the shoe. Each wiper has a dovetail-shaped shank portion 439 (Fig. 3) slidably mounted in a similarly shaped groove formed in an arm 440 fast to the forward end of a shaft 442 rotatably mounted in a bracket 444 fast to a transversely extending shaft 446 mounted to slide in bearings 447 on the frame 55 of the machine. Each bracket 444 has in its opposite side faces grooves arranged to receive loosely the arms of a substantially U-shaped bracket 448 secured to the bracket 30 by screws 450 (Fig. 4), the construction being such that the heightwise position of the bracket 30 may be varied relatively to the wipers 438 to accommodate lasts of different lengths, the wipers 438 being adjustable, however, with the brackets 30 into different lateral positions to accommodate right and left lasts. Fast to the opposite end portion on the shaft 442 is an arm 452 connected by a link 454 to an arm 456 pinned to the reduced inner end portion of the rockshaft 416. From the above description it will be evident that as each arm 414 (Fig. 1) is swung in a direction to move its associated arm 342 inwardly along the shaft 334, the shaft 416 is rocked in a direction to impart downward swinging movement to the arm 456 pinned to the shaft. As each arm 456 is swung downwardly it acts through the arm 452 and the shaft 442 to swing the arm 440 in a direction to move its associated wiper 438 inwardly over the bottom of the shoe. It will be evident that the rolls 322 at each side of the shoe are moved inwardly over the bottom of the shoe in advance of the wipers 438 so that as the wipers are thus swung inwardly over the bottom of the shoe they act on the upper through the apron to lay the marginal portion of the upper inwardly over the insole and to press it into position to adhere to the insole at the opposite sides of the ball portion of the shoe. In order to insure adequate pressure of the wipers on the marginal portion of the upper, there is mounted in a recess in each arm 440 a spring 458 (Fig. 9) which tends to urge its associated wiper outwardly relatively to the arm 440, outward movement of the wiper being limited by the engagement of the head of a screw 460 threaded into the shank portion of the wiper with the inner end face 462 of the arm 440.

Figure 22:
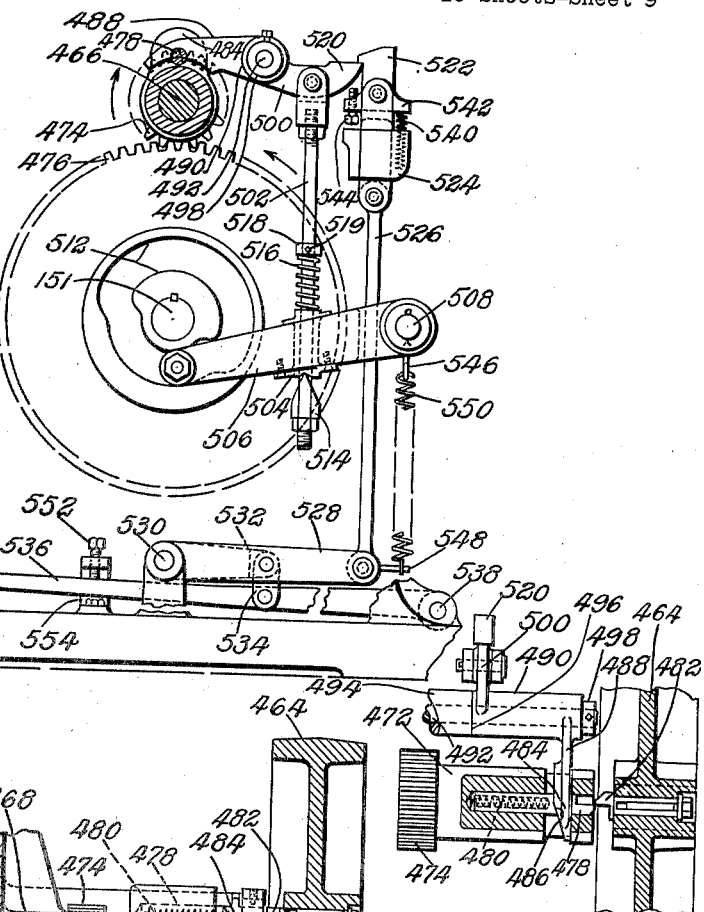
Fig. 22 is a view in side elevation of a portion of the mechanism shown in Fig. 21.

The machine herein shown is operated by a belt (not shown) engaging a pulley 464 (Figs. 1 and 21) rotatably mounted on a shaft 466 supported at one end by a bearing 468 on the frame 55 and at the other end by a bracket 470 extending upwardly from the frame 55. Between the pulley 464 and the bearing 468 there is mounted on the shaft 466 a sleeve 472 and formed integral with the sleeve is a pinion 474 the teeth of which engage the teeth of a gear 476 keyed to the shaft 151. The sleeve 472 is bored to receive a pin 478 (Figs. 21 and 23) which is urged by a spring 480 in a direction to engage a pin 482 fast in the hub portion of the pulley 464 but which is normally held retracted against the tension of the spring 480 by the engagement of a wedge 484 with a similarly shaped slot 486 in the pin 478. The wedge 484 is carried by one arm 488 of a bell-crank lever 490 which is mounted to rock on a shaft 492 supported in a bearing 494 on the frame 55 and is held against movement lengthwise of the shaft by a finished surface 496 on the bearing 494 and a collar 498 fast to the outer end of the shaft. The bell-crank lever 490 has a rearwardly extending arm 500 to which there is pivotally connected a rod 502 (Fig. 22) that extends downwardly through an enlarged opening in a block 504 fast to an arm 506 pivotally connected at 508 to the frame 55 and carrying at its inner end a roll 510 arranged to engage a cam path 512 formed in the hub portion of the gear 476. Threaded on the lower end of the rod 502 is a V-shaped block 514 which is held in engagement with a notch on the bottom face of the block 504 by a spring 516 surrounding the rod 502 between the upper face of the block 504 and an adjustable collar 518 secured to the rod by a screw 519. The rearwardly extending arm 500 of the bell-crank lever 490 has a tail portion 520 arranged to be engaged by a notched plate 522 pivotally connected to a block 524 to which there is pivotally connected a link 526 which extends downwardly through an enlarged opening in the arm 506 and is pivotally connected at its lower end to a rearwardly extending arm 528 fast to a shaft 530 journaled in the frame 55 and having secured to it a second arm 532 connected by a short link 534 to a treadle 536 pivotally connected at 538 to the frame 55. A spring 540 seated in a recess in the block 524 and engaging a lateral projection 542 on the plate 522 tends normally to hold the plate with its notched portion in engagement with the tail portion 520 of the arm 500, a set screw 544 being provided for limiting swinging movement of the plate by the spring when the plate and arm are disconnected. Connected at one end to a pin 546 projecting from the frame 55 and at the other end to a pin 548 in the arm 528 is a spring 550 which tends to swing the arm 528 in a direction to hold the treadle 536 in engagement with an adjustable stop, illustrated as a screw 552 carried by a substantially U-shaped bracket 554 that straddles the treadle and is secured to the frame 55 (Fig. 22). It will be understood that by adjusting the screw 552 the heightwise position of the notched plate 522 may be varied.

Figures 21, 23:
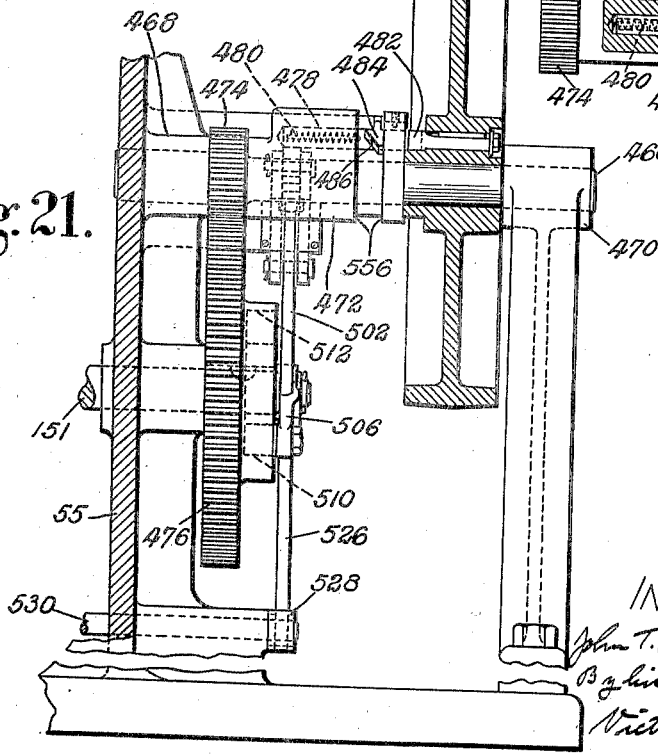
Fig. 21 is a view partly in front elevation and partly in section of the power driving means and the starting and stopping mechanism.
Fig. 23 is a detail view partly in plan and partly in section of the clutch and associated parts.

When the operator depresses the starting treadle 536 the bell-crank lever 490 is swung against the resistance of the spring 516 in a direction to operate the wedge 484 to release the pin 478 to the action of its spring 480 which moves the pin outwardly into position to be engaged by the pin 482 in the continuously driven pulley 464 to start the operation of the machine. Release of the treadle by the operator permits the spring 550 to return the notched plate 522 to its initial position (Fig. 22) with the treadle 536 in engagement with the adjustable stop 552, and the spring 516 through the link 502 to swing the bell-crank lever 490 in a direction to position the wedge 484 in engagement with the sleeve 472 in a circumferential groove 556 formed in the sleeve (Fig. 21). As thus positioned, the wedge 484 engages the pin 478 in the wedge-shaped groove formed in the pin and cams it out of engagement with the pin 482 at the end of one complete rotation of the pinion 474 to stop the operation of the machine. One complete rotation of the pinion 474 causes the gear 476 and the shaft 151 to be turned through 90° of their cycle. As the machine is again started by depression of the treadle 536, the cam 512 acts to swing the arm 506 downwardly and through the rod 502 to impart to the bell-crank lever 490 a further swinging movement in a direction to raise the wedge 484 and to hold the wedge thus raised during two complete rotations of the pinion 474, after which, during the next rotation of the pinion 474, the arm 506 and the bell-crank lever 490 are returned to their initial positions (Fig. 22) with the wedge in position again to engage the pin 478 and to withdraw it from engagement with the pin 482 to stop the operation of the machine at the end of that rotation of the pinion.

In the operation of the machine the operator, after adjusting the position of the U-shaped bar 36 heightwise of the last and the inclination of the waist grippers for the style of shoe to be operated upon and with the bracket 30 in proper lateral position either for a right or a left shoe, places a last having an insole assembled thereon in engagement with the feet 32 and the heel end support 36 with the toe end of the last in engagement with the abutment 34 and depresses the starting treadle 536 to start the operation of the machine, whereupon the clamping members 44 are moved inwardly to clamp the heel end of the last and to hold it in the position in which it has been presented by the operator. It is at this time in the cycle that the machine is brought to a stop to permit the operator to place the forepart of a two-part upper on the last and to position it in proper relation to the forepart and waist portions of the last with the margin of the upper introduced between the jaws 130, 132 of the toe grippers and the jaws 228, 230 of the side grippers. It will be understood that cement will have been previously applied to the marginal portion of the upper, which in the type of shoe herein shown terminates short of the heel end of the last, along the opposite sides of the waist and ball portions, and if desired also, to the margins of the insole along the opposite sides of its ball and shank portions before the last is presented to the machine and the forepart of the upper is mounted on the last as above described.

Figure 27:
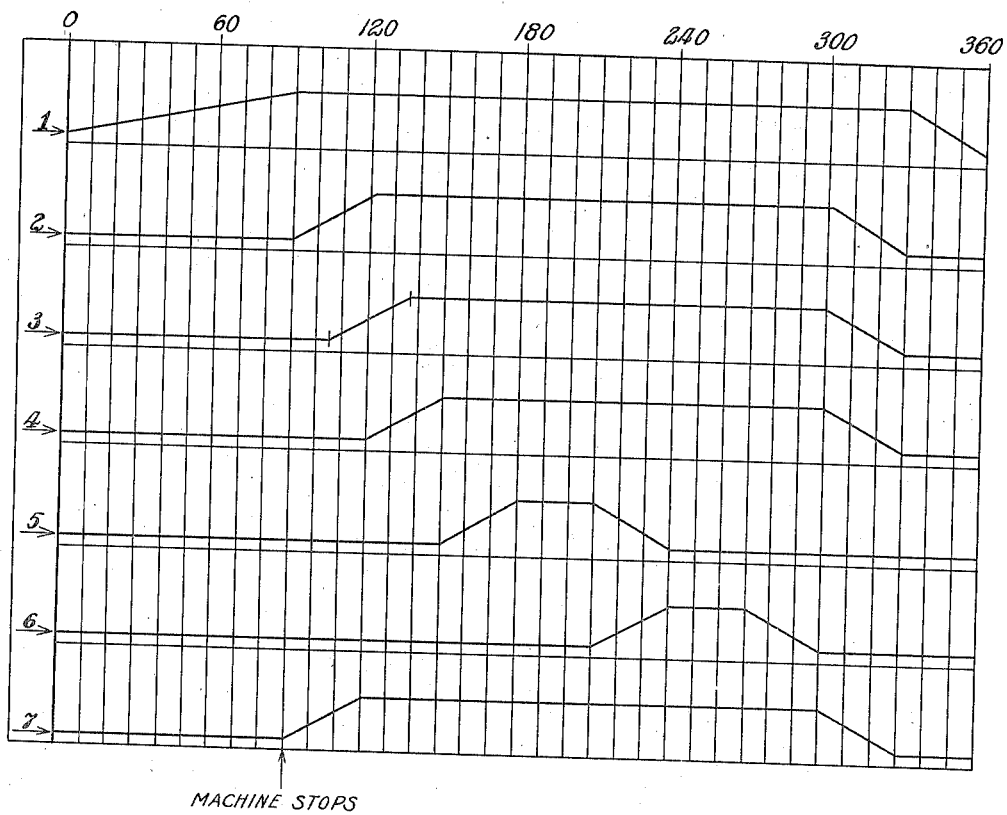
Fig. 27 is a diagram illustrating the relative timing of the cams which operate different parts of the machine.

The relative timing of the cams for operating the different instrumentalities is illustrated diagrammatically in Fig. 27, the numeral 1 referring to the cam for operating the last clamping members 44, the numerals 2 and 3 referring respectively to the cams for operating the waist and toe grippers, the numeral 4 referring to the cam for imparting to the arms 342 their downward swinging movement to apply the apron tightly to the upper about the waist portion of the last, the numerals 5 and 6 referring respectively to the cams for imparting to the arms 342 alternately their movements laterally of the machine, and the numeral 7 referring to the cam for operating the arm 506 to control the position of the wedge 484.

With the forepart of the shoe upper thus positioned on the last the operator depresses the starting treadle 536 to start the machine again, whereupon the waist grippers are operated to grip the upper simultaneously at the opposite sides of its waist portion and to pull it heightwise of the last to tension the upper tightly over the last, and the toe gripper is operated to grip and pull the upper lengthwise of the last after the beginning of the upper pulling movements of the waist grippers. Substantially at the time when the waist grippers complete their upper pulling movement the arms 342 and the overlaying devices 332 are swung downwardly to bring the apron 328 into engagement with the upper and to pull the apron heightwise of the last in a direction inclined rearwardly toward its heel end, the arm 392 being moved relatively to the support 374 with the apron by reason of its connection with the apron through the blocks 400. As the arm 392 is thus moved the shoe support 394 is moved toward the last and shoe by the swinging of the support 374 about its pivot 372 into position to press the upper through the apron against the top face of the last.

At the end of the downward swinging movement of the arms 342, the arm 342 at the right-hand side of the machine is moved bodily inward along the shaft 344 to carry the roll 332 at that side of the machine inwardly over the shoe bottom. As the roll 332 moves inwardly over the bottom of the shoe the apron 328 acts to wrap the upper about the curved portion of the last adjacent to its bottom face and to lay its marginal portion inwardly over the insole, the roll 332 acting through the apron to press the marginal portion of the upper firmly into position to adhere to the insole. It will be understood that as the arm 342 is moved bodily inward the gripper at that side of the machine is moved inwardly with the arm to overdraw the upper, and substantially at that time when the roll 332 begins to press the marginal portion of the upper through the apron into position to adhere to the insole the gripper is tripped to release the upper as hereinbefore described. As the arm 342 is moved inwardly along the shaft 344 the wiper 438 at that side of the shoe is swung downwardly and inwardly over the bottom of the shoe to lay the marginal portion of the upper along the ball portion of the shoe through the apron inwardly over the insole and to press it into position to adhere to the insole. After the roll 332 and the wiper 438 have completed their inward movements they are held in their innermost positions while maintaining their pressure on the overlasted margin of the upper until the cement has set sufficiently to hold the upper in lasted position, after which the arm 342 is moved outwardly, and the wiper 438 is returned to its initial starting position. Substantially at the beginning of the outward movement of the arm 342 at the right-hand side of the machine the arm 342 at the left-hand side of the machine is moved bodily inward along the shaft 344, and as this arm moves inwardly the operations above described are performed at the left-hand side of the shoe to draw the upper inwardly over the insole and to lay and press its marginal portion into position to adhere to the insole along the waist and ball portions of the shoe. It will be understood that during the inward movement of the arm 342 at the left-hand side of the machine, the arm 342 at the right-hand side of the machine is held in its lowermost position so that the tension of the apron on the upper is not relaxed as the marginal portion of the upper at the left-hand side of the shoe is laid inwardly over the insole and pressed into position to adhere thereto. After the cement has set sufficiently to hold the upper in lasted position the arm 342 at the left-hand side of the machine is moved outwardly and the wiper 438 at that side of the machine is swung upwardly to its initial position. Thereafter the toe gripper is operated to release the upper and all parts are returned to their initial starting positions, the last and shoe being released by outward movement of the clamping members 44, whereupon the machine is again stopped by the action of the wedge 484 on the pin 478. The shoe may then be operated upon by a bed lasting machine provided with wipers that extend rearwardly as far as the ball line to complete the lasting of the forepart, after which the heel end of the two-part upper may be assembled on the last and its marginal portion fastened to the insole around the heel end. Thereafter an outsole may be applied to the shoe and the shoe finished in the usual manner.

Having described the invention, what I claim as new and desire to secure by Letters Patent of the United States is:

1. That improvement in methods of shaping over a last a shoe upper terminating short of the heel end of the last preparatory to lasting its toe end, which consists in pulling such an upper over a last at the opposite sides of its waist portion and after beginning thus to pull the upper subjecting it also to lengthwise strain by a pull applied at its toe end, then fastening the margin of the upper at the sides of the waist portion of the last to an insole on the last while maintaining the upper under lengthwise strain by the pull at its toe end, and thereafter releasing the margin of the toe end of the upper in an unfastened condition.

2. That improvement in methods of shaping over a last a shoe upper terminating short of the heel end of the last preparatory to lasting its toe end, which consists in pulling such an upper over a last at the opposite sides of its waist portion and after drawing it tightly about the last by such a pull subjecting it also to lengthwise strain by a pull applied at the margin of its toe end, then laying the margin of the upper at the sides of the waist portion of the last inwardly over an insole on the last and pressing it into position to adhere to the insole while maintaining the upper under lengthwise strain by the pull at its toe end, and thereafter releasing the margin of the toe end of the upper in an unfastened condition.

3. That improvement in methods of shaping over a last a shoe upper terminating short of the heel end of the last preparatory to lasting its toe end, which consists in subjecting such an upper on a last to heightwise strain by pulling it at the opposite sides of the last in a direction substantially normal to that portion of the bottom face of the last that curves heightwise of the last from the ball toward the shank, tensioning the upper lengthwise of the last by a pull applied at its toe end after beginning the pull at the sides, then while maintaining the upper under lengthwise strain by the pull applied to its toe end fastening the margin of the upper at the sides of the waist portion of the last to an insole on the last, and thereafter releasing the margin of the toe end of the upper in an unfastened condition.

4. That improvement in methods of shaping over a last a shoe upper terminating short of the heel end of the last preparatory to lasting its toe end, which consists in pulling such an upper over a last at the sides of its waist portion and after beginning thus to pull the upper subjecting it also to lengthwise strain by a pull applied at the margin of its toe end, then conforming the upper tightly to the contour of the waist portion of the last and laying its marginal portion heelwardly of the junction of the forepart and shank portion of the last inwardly over an insole on the last and pressing it into position to adhere to the insole first at one side of the last and then at the opposite side of the last while maintaining the upper under lengthwise strain by the pull at its toe end, and thereafter releasing the margin of the toe end of the upper in an unfastened condition.

5. That improvement in methods of shaping over a last a shoe upper terminating short of the heel end of the last preparatory to lasting its toe end, which consists in subjecting an upper on a last to heightwise strain by pulling it at the opposite sides of the last in a direction substantially normal to that portion of the bottom face of the last that curves heightwise of the last from the ball toward the shank, tensioning the upper lengthwise of the last by a pull applied at the margin of its toe end after drawing it tightly about the last by the pull at the sides, then while maintaining the upper under lengthwise strain by the pull applied at its toe end laying its margin at the opposite sides of the ball portion and rearwardly toward the shank inwardly over an insole on the last and pressing it into position to adhere to the insole, and thereafter releasing the margin of the toe end of the upper in an unfastened condition.

6. In a machine for shaping over a last a shoe upper terminating short of the heel end of the last, means for subjecting such an upper on a last to lengthwise strain by a pull applied at its toe end, and means for pulling the upper over the last at the opposite sides of the waist portion of the last before the beginning of the pull at its toe end and for fastening it at the sides of the waist portion to an insole on the last after the completion of the pull at its toe end and while still maintaining the upper under said lengthwise strain.

7. In a machine for shaping over a last a shoe upper terminating short of the heel end of the last, means for pulling such an upper over a last at the opposite sides of the waist portion of the last, means for subjecting the upper to lengthwise strain by a pull applied to its toe end, and means for laying the margin of the upper at the sides of the waist portion of the last inwardly over an insole on the last and for pressing it into position to adhere to the insole while still maintaining the upper under lengthwise strain by the pull applied at its toe end.

8. In a machine for shaping over a last a shoe upper terminating short of the heel end of the last, waist grippers arranged to grip the margin of such an upper at the sides of the waist portion of the last and to pull the upper heightwise of the last, a toe gripper arranged to grip the margin of the toe end of the upper and to subject the upper to lengthwise strain after the beginning of the upper pulling movement of said waist grippers, and overlaying devices arranged to lay the marginal portion of the upper at the sides of the waist portion inwardly over an insole on the last while the upper is held under tension by said toe gripper.

9. In a machine for shaping over a last a shoe upper terminating short of the heel end of the last, grippers for gripping and pulling such an upper over a last at the sides of the waist portion of the last, a gripper for gripping the margin of the upper at the toe end movable to tension the upper lengthwise of the last after the beginning of the upper pulling movement of said waist grippers, and means for laying the marginal portion of the upper at the opposite sides of the last rearwardly of the junction of the forepart and shank portions of the last inwardly over an insole on the last and for pressing it into position to adhere to the insole while the upper is still held under tension by said toe gripper.

10. In a machine for shaping over a last a shoe upper terminating short of the heel end of the last, grippers for gripping and pulling such an upper over a last at the sides of the waist portion of the last, a gripper for gripping the margin of the upper at the toe end movable to tension the upper lengthwise of the last after the beginning of the upper pulling operation of said waist grippers, and overlaying devices movable inwardly over the bottom of the last first at one side of the last and then at the opposite side of the last to lay the marginal portion of the upper inwardly over an insole on the last and to press it into position to adhere to the insole while the upper is still held under tension by said toe gripper.

11. In a machine for shaping over a last a shoe upper terminating short of the heel end of the last, grippers arranged respectively to pull such an upper over a last at its opposite sides in directions substantially normal to that portion of its bottom face that curves heightwise of the last from the ball toward the shank, devices curved similarly to that portion of the bottom face of the last for laying the marginal portion of the upper inwardly over an insole on the last and pressing it into position to adhere to the insole, and means for subjecting the upper to lengthwise strain after the beginning of the upper pulling operation of said side grippers and for holding the upper thus tensioned during the overlaying movements of said devices.

12. In a machine for shaping over a last a shoe upper terminating short of the heel end of the last, grippers for gripping and pulling such an upper over a last at the sides of the waist portion of the last, a gripper for gripping the margin of the upper at the toe end movable to tension the upper lengthwise of the last after the beginning of the upper pulling operation of said waist grippers, overlaying devices at the opposite sides of the waist portion of the last movable inwardly over the bottom of the last to lay the marginal portion of the upper over an insole on the last and to press it into position to adhere to the insole, and means for operating said waist grippers to release the upper in response to the inward movements of said overlaying devices.

13. In a machine for shaping over a last a shoe upper terminating short of the heel end of the last, grippers for gripping and pulling such an upper over a last at the opposite sides of the waist portion of the last, a gripper for gripping the margin of the upper at the toe end movable to tension the upper lengthwise of the last after the beginning of the upper pulling operation of said waist grippers, overlaying devices at the opposite sides of the waist portion of the last movable inwardly over the bottom of the last to lay the marginal portion of the upper over an insole on the last in position to adhere to the insole, said waist grippers being mounted to move inwardly with said overlaying devices to overdraw the upper, and means for operating each of said waist grippers to release the upper at a predetermined time in the inward movement of its associated overlaying device.

14. In a machine for shaping over a last a shoe upper terminating short of the heel end of the last, grippers for gripping and pulling such an upper over a last at the opposite sides of its waist portion and at the toe end, overlaying devices for laying the marginal portion of the upper at the opposite sides of the waist portion inwardly over an insole on the last and for pressing it into position to adhere to the insole, and power-operated means for operating the waist grippers to pull the upper in advance of the toe gripper and for operating the toe gripper to release the upper after the overlaying devices have completed their inward movements.

15. In a machine for shaping over a last a shoe upper terminating short of the heel end of the last, means for pulling such an upper over a last at the opposite sides of its waist portion, means for subjecting the upper to lengthwise strain by a pull applied at its toe end, and means for conforming the upper to the contour of the waist portion of the last and for laying its marginal portion inwardly over an insole on the last in position to adhere to the insole while the upper is still held under tension by the pull applied at its toe end.

16. In a machine for shaping over a last a shoe upper terminating short of the heel end of the last, means for pulling such an upper over a last at the opposite sides of the waist portion, means for subjecting the upper to lengthwise strain by a pull applied at its toe end, and a flexible apron for conforming the upper to the contour of the waist portion of the last and for laying its marginal portion inwardly over an insole on the last in position to be secured to the insole by an adhesive while the upper is maintained under lengthwise strain by the pull applied at its toe end.

17. In a machine for shaping over a last a shoe upper terminating short of the heel end of the last, means for pulling such an upper over a last at the opposite sides of the waist portion of the last, means for subjecting the upper to lengthwise strain by a pull applied at its toe end, a flexible apron, and means for pulling the apron heightwise of the last and inwardly over an insole on the last to cause the apron to conform the upper to the heightwise curvatures of the lateral faces of the waist portion of the last and to lay the marginal portions of the upper at the opposite sides of the waist portion inwardly over the insole in position to adhere thereto while the upper is held under lengthwise strain by the pull applied at its toe end.

18. In a machine for shaping over a last a shoe upper terminating short of the heel end of the last, means for pulling such an upper over a last at the opposite sides of the waist portion of the last, means for subjecting the upper to lengthwise strain by a pull applied at its toe end, and means for conforming the upper to the contour of the waist portion of the last and for laying its marginal portion inwardly over an insole on the last in position to adhere to the insole while the upper is held under tension by the pull applied at its toe end, said last-named means comprising a flexible apron and devices connected to the opposite end portions of said apron and movable to pull the apron heightwise of the last and inwardly over its bottom face, said devices being arranged to act through the apron to increase its pressure on the margin of the upper.

19. In a machine for shaping over a last a shoe upper terminating short of the heel end of the last, means for pulling such an upper over a last at the opposite sides of its waist portion, means for subjecting the upper to lengthwise strain by a pull applied at its toe end, and means for conforming the upper to the contour of the waist portion of the last and for laying its marginal portion inwardly over an insole on the last in position to adhere thereto while the upper is held under tension by the pull applied at its toe end, said last-named means comprising a flexible apron, a pair of rolls connected respectively to the opposite end portions of said apron one at each side of the last, and means for moving the rolls heightwise of the last to draw the apron tightly about the waist portion of the last and for then moving the rolls inwardly over the bottom of the last to cause the apron to lay the marginal portion of the upper upon the insole, said rolls being arranged to act through said apron during their inward movements to increase the pressure of the apron on the margin of the upper.

20. In a machine for shaping over a last a shoe upper terminating short of the heel end of the last, grippers for pulling such an upper over a last at the opposite sides of its waist portion, means for subjecting the upper to lengthwise strain by a pull applied at its toe end, and means for conforming the upper to the contour of the waist portion of the last and for laying its marginal portion inwardly over an insole on the last while the upper is held under tension by the pull applied at its toe end, said last-named means comprising a flexible apron, a pair of rolls connected respectively to the opposite end portions of said apron one at each side of the last, and means for moving said rolls heightwise of the last to tension the apron about the waist portion of the last and for then moving the rolls inwardly over the bottom of the last to cause the apron to lay the marginal portion of the upper upon the insole, said rolls being curved to conform substantially to the lengthwise curvature of that portion of the last bottom that extends rearwardly from the ball toward the shank and being arranged to act through the apron during their inward movements to increase the pressure of the apron on the margin of the upper.

21. In a machine for shaping over a last a shoe upper terminating short of the heel end of the last, grippers arranged respectively to pull such an upper over a last at its opposite sides in locations where the edge of the last bottom curves inwardly from the ball toward the shank, a gripper for gripping the margin of the upper at the toe end movable to tension the upper lengthwise of the last after the beginning of the upper pulling movements of said side grippers, means for conforming the upper to the contour of the waist portion of the last and for laying its marginal portion inwardly over an insole on the last in position to adhere thereto while the upper is held under tension by said toe gripper, said means comprising a flexible apron, devices for pulling the apron heightwise of the last and inwardly over the insole, said devices being shaped to conform substantially to that portion of the last bottom that curves upwardly from the ball toward the shank and being arranged to act through the apron to increase its pressure on the margin of the upper, and other devices arranged to act on the margin of the upper through said apron to lay it over the insole at the opposite sides of the ball portion of the last.

22. In a machine for operating on shoes, a flexible apron, a pair of rolls about which the opposite end portions of said apron are wound, said rolls being located one at each side of the last, means for moving said rolls heightwise of the last in a direction inclined rearwardly toward its heel end to stretch the apron about the waist portion of the last and for then moving said rolls inwardly over an insole on the last to cause the apron to conform the upper to the heightwise curvatures of the lateral faces of the last and to lay its marginal portion inwardly over the insole, and spring means against the resistance of which said rolls are rotatable in response to the pull of the apron thereon.

23. In a machine for operating on shoes, the combination with means for supporting a last, of a flexible apron, a pair of rolls about which the opposite end portions of said apron are wound, spring means for rotating said rolls in directions to tension the apron between them, and means for effecting relative movement of said rolls and the last heightwise of the last to stretch the apron about the last and for thereafter moving said rolls inwardly over the bottom of the last first at one side of the last and then at the opposite side of the last to cause the apron to conform the upper to the heightwise curvatures of the lateral faces of the last and then to lay its marginal portion inwardly over an insole on the last in position to adhere thereto.

24. In a machine for shaping uppers over lasts, the combination with last supporting means, of a flexible apron, overlaying devices connected respectively to the opposite end portions of said apron one at each side of the last, means for moving said devices heightwise of the last with components of movement rearwardly toward its heel end to tension the apron about the waist portion of the last and for thereafter moving said devices inwardly over an insole on the last in locations where the edge of the last bottom curves inwardly from the ball toward the shank to cause the devices to lay and press the marginal portion of the upper in those locations through said apron upon the insole, and wipers arranged to act through said apron on the marginal portion of the upper in locations just toewardly of said overlaying devices to lay and press it upon the insole.

25. In a machine for shaping uppers over lasts, forepart and heel end supports relatively adjustable heightwise of a last to accommodate lasts of different styles, and grippers for pulling an upper over the last at the opposite sides of its waist portion in a direction substantially normal to that portion of the last bottom that curves heightwise of the last from the ball toward the shank, said grippers being adjustable relatively to said forepart support to vary the direction of their pull in accordance with variations in the relative positions of said forepart and heel end supports.

26. In a machine for shaping uppers over lasts, a support for the forepart of a last, a heel end support adjustable heightwise of the last relatively to said forepart support to accommodate lasts of different styles, grippers for pulling an upper over the last at the opposite sides of its shank portion in a direction substantially normal to that portion of the last bottom that curves heightwise of the last from the ball toward the shank, and connections between said grippers and the heel end support for swinging the grippers about an axis extending laterally of the last in response to adjustment of the heel end support heightwise of the last to vary the direction of their pull on the upper in operating on lasts of different styles.

27. In a machine for shaping uppers over lasts, a support for the forepart of a last, a heel end support, grippers for gripping and pulling an upper over the last at the opposite sides of its waist portion, and means for relatively adjusting the forepart and heel end supports heightwise of the last to accommodate lasts of different styles and for simultaneously adjusting the grippers about an axis extending laterally of the last and located adjacent to the junction of the forepart and waist portions of the bottom of the last.

28. In a machine for shaping uppers over lasts, a support for the forepart of a last, a heel end support, grippers for gripping an upper at the opposite sides of the waist portion of the last and movable heightwise of the last to tension the upper over the last, a member in which said grippers are movable to tension the upper, said member being mounted to swing about an axis extending laterally of the last and located adjacent to the junction of the bottom of the forepart and waist portions of the last, and means for relatively adjusting the forepart and heel end supports heightwise of the last to accommodate lasts of different styles and for imparting to said member simultaneously swinging movements about said axis to position the grippers for movement relative to each last in a direction substantially normal to that portion of the last bottom that curves heightwise of the last from the ball toward the shank.

29. In a lasting machine, a toe gripper arranged to grip the toe end of an upper and movable to tension the upper over a last, a support on which said gripper is thus movable, a bellcrank lever mounted on said support and swingable to operate said toe gripper, a cam-operated rod for swinging said bell-crank lever, a sleeve threaded on said rod and connected to said bellcrank lever, and means for moving said support in directions lengthwise of the last to adjust the toe gripper for operating on lasts of different lengths and for simultaneously rotating said sleeve on said rod to prevent relative swinging movement of the rod and said bell-crank lever as the toe gripper is thus adjusted.

30. In a lasting machine, a support for the heel end of a last, a forepart support, said forepart support being adjustable lengthwise of the last relatively to said heel end support to accommodate lasts of different lengths, a toe gripper mounted on said forepart support, a bell-crank lever also mounted on said support and swingable to operate said gripper to grip and pull an upper over the last, and power-operated means for swinging said bell-crank lever comprising parts relatively adjustable in directions lengthwise of the last in response to adjustment of said forepart support.

31. In a lasting machine, a support for the heel end of a last, a forepart support, said forepart support being adjustable laterally of the last into different positions for right and left lasts and being also adjustable lengthwise of the last to accommodate lasts of different lengths, a toe gripper mounted on said forepart support for gripping the toe end of an upper, said gripper being movable heightwise of the last to pull the upper, a bell-crank lever mounted on said forepart support and swingable to operate said gripper, and cam-operated means for swinging said bell-crank lever comprising parts relatively adjustable in directions lengthwise of the last in response to lengthwise adjustment of said forepart support and a link swingable laterally of the last to maintain an operative connection between said cam-operated means and the bell-crank lever in response to lateral adjustment of the forepart support.

32. In a lasting machine, the combination with forepart and heel end supports, said forepart support being adjustable laterally of the last relatively to said heel end support into different positions for right and left lasts, of wipers adjustable with said forepart support for wiping the marginal portion of an upper at the opposite sides of the ball portion of the last inwardly over an insole on the last.

33. In a lasting machine, the combination with forepart and heel end supports, said forepart support being adjustable laterally of the last relatively to said heel end support into different positions for right and left lasts, of wipers adjustable with said forepart support for wiping the margin of the upper at the opposite sides of the ball portion of the last inwardly over an insole on the last, said wipers being mounted for swinging movements about axes extending heightwise of the last and located toewardly of its ball portion.

34. In a lasting machine, forepart and heel end supports relatively adjustable heightwise of a last to accommodate lasts of different styles, wipers arranged respectively to wipe the marginal portion of an upper at the opposite sides of the ball portion of the last inwardly over an insole on the last, and means for adjusting said wipers and the forepart support laterally of the last relatively to said heel end support to accommodate right and left lasts.

35. In a lasting machine, forepart and heel end supports relatively adjustable heightwise of a last to accommodate lasts of different styles, said forepart support being movable laterally of the last into different positions for right and left lasts, wipers for wiping the marginal portion of the upper at the opposite sides of the ball portion of the last inwardly over an insole on the last, and means for adjusting said forepart support lengthwise of the last relatively to said heel end support and the wipers to accommodate lasts of different lengths.

36. In a lasting machine, forepart and heel end supports relatively adjustable heightwise of a last to accommodate lasts of different styles, said forepart support being mounted for swinging movements laterally of the last about an axis extending heightwise of the last into different positions for right and left lasts, wipers adjustable laterally of the last in response to the swinging movements of said forepart support for wiping the margin of an upper at the opposite sides of the ball portion of a last inwardly over an insole on the last, and means for relatively adjusting said wipers and the forepart support lengthwise of the last to accommodate lasts of different lengths.

37. In a machine for shaping uppers over lasts, means for pulling an upper over a last at the opposite sides of its waist portion and at the toe end, a flexible apron, and means for tensioning the apron about the waist portion of the last and for laying the opposite marginal portions of the upper through said apron inwardly over an insole on the last in locations where the edge of the last bottom curves inwardly from the ball toward the shank.

38. In a machine for shaping uppers over lasts, means for pulling an upper over a last at the opposite sides of its waist portion and at the toe end, a flexible apron, devices connected to the opposite end portions of said apron, one at each side of the last, means for effecting relative movement of said devices and the last to tension the apron about the waist portion of the last, and means for moving said devices inwardly over the bottom of the last to cause the apron to lay the marginal portion of the upper upon an insole on the last, said devices being arranged to act through said apron during their inward movements to increase the pressure of the apron on the upper.

39. In a machine for shaping uppers over lasts, grippers for pulling an upper over a last at the opposite sides of its waist portion simultaneously, overlaying devices movable inwardly over the bottom of the last first at one side and then at the opposite side of the last to lay and press the marginal portion of the upper upon an insole on the last, said devices being shaped to conform substantially to the lengthwise curvature of that portion of the last bottom that extends rearwardly from the ball toward the shank, and means for releasing the grippers from the upper in time relation to the inward movements of the overlaying devices.

40. In a machine for shaping uppers over lasts, grippers for gripping and pulling an upper over a last at its opposite sides in locations where the edge of the last bottom curves inwardly from the ball toward the shank, and rolls movable inwardly over the bottom of the last in locations where the upper has been pulled by said grippers for laying and pressing the marginal portion of the upper upon an insole on the last, said rolls being curved lengthwise of the last to conform substantially to the curvature of that portion of the bottom face of the last that extends rearwardly from the ball toward the shank.

41. In a machine for shaping uppers over lasts, means for clamping and holding a last while the operator positions an upper on the last, and means for shaping the upper over the last and for laying its marginal portions at the opposite sides of the last inwardly over an insole on the last.

42. In a machine for shaping uppers over lasts, means for clamping and holding a last while the operator positions the forepart of a two-part upper on the last, side grippers arranged respectively to pull the upper over the last in locations where the edge of the last bottom curves inwardly from the ball toward the shank, a gripper for gripping the margin of the upper at the toe end and movable to tension the upper lengthwise of the last after the beginning of the upper pulling operation of the side grippers, and means for laying the opposite marginal portions of the upper inwardly over an insole on the last in position to adhere thereto in locations where the upper has been tensioned by said side grippers while the toe gripper remains stationary with the upper under lengthwise strain.

43. In a machine for shaping uppers over lasts, means for clamping and holding a last while the operator positions the forepart of a two-part upper on the last, grippers for gripping and pulling the upper over the last at the opposite sides of its waist portion, a gripper for gripping the margin of the upper at the toe end and movable to tension the upper lengthwise of the last after the beginning of the upper pulling operation of said waist grippers, and means for conforming the upper to the contour of the waist portion of the last and for laying its margin along the opposite sides of the ball portion and rearwardly toward the shank inwardly over an insole on the last and pressing it into position to adhere to the insole while the toe gripper remains stationary with the upper under lengthwise strain.

44. In a machine for shaping uppers over lasts, means for clamping the heel end of a last and for holding it while the operator positions the forepart of a two-part upper on the last, side grippers arranged respectively to pull the upper over the last in locations where the edge of the last bottom curves inwardly from the ball toward the shank, a gripper for gripping the margin of the upper at the toe end and movable to tension the upper lengthwise of the last after the beginning of the upper pulling operation of said side grippers, a flexible apron, and means for pulling the flexible apron tightly about the waist portion of the last to conform the upper to the contour of the last and to lay its marginal portion inwardly over an insole on the last in position to adhere to the insole while the upper is held under lengthwise strain by said toe gripper.

45. In a machine for shaping uppers over lasts, means for clamping the heel end of a last and for holding it while the operator positions the forepart of a two-part upper on the last, grippers for gripping and pulling the upper over the last at its opposite sides and at the toe end, a flexible apron arranged to extend across the top face of the last in a position out of engagement with the upper, and means for moving the apron into engagement with the upper and for then pulling the apron heightwise of the last and inwardly over an insole on the last to cause the apron to conform the upper to the contour of the last and to lay its marginal portion inwardly over the insole in position to adhere thereto through the action of cement.

46. In a machine for shaping uppers over lasts, means for clamping the heel end of a last and for holding it while the operator positions the forepart of a two-part upper on the last, a flexible apron for conforming the upper to the contour of the last, said apron being arranged to extend initially across the top face of the last in a position out of engagement with the upper, overlaying devices connected to the opposite end portions of said apron and movable heightwise of the last to tension the apron over the last, said devices being movable thereafter inwardly over the bottom of the last to lay the marginal portion of the upper through said apron inwardly over an insole on the last and to press it into position to adhere to the insole, and a member movable into position to support the last for the overlaying operation.

47. In a machine for shaping uppers over lasts, the combination with last supporting means, of means for clamping the heel end of a last on said supporting means and for holding it while the operator positions the forepart of a two-part upper on the last, a flexible apron for conforming the upper to the contour of the last, said apron being arranged to extend initially across the top of the forepart of the last in a position out of engagement with the upper, overlaying devices connected to the opposite end portions of said apron, means for moving said overlaying devices heightwise of the last to tension the apron over the last and for thereafter imparting to said devices movements inwardly over the bottom of the last to lay and press the marginal portion of the upper through said apron upon an insole on the last, a member movable with said apron into position to apply pressure to the top of the forepart of the last, and means for increasing the pressure of said member on the last during the movement of said overlaying devices heightwise of the last.

JOHN T. LANCASTER.